United States Patent
Hamlet et al.

(10) Patent No.: US 9,992,219 B1
(45) Date of Patent: Jun. 5, 2018

(54) FRAMEWORK AND METHODOLOGY FOR SUPPLY CHAIN LIFECYCLE ANALYTICS

(71) Applicant: National Technology & Engineering Solutions of Sandia, LLC, Albuquerque, NM (US)

(72) Inventors: Jason Hamlet, Albuquerque, NM (US); Brandon K. Eames, Albuquerque, NM (US); Gio K. Kao, Albuquerque, NM (US); Han Wei Lin, Albuquerque, NM (US); Ryan Helinski, Albuquerque, NM (US); John T. Michalski, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 197 days.

(21) Appl. No.: 14/940,005

(22) Filed: Nov. 12, 2015

Related U.S. Application Data

(60) Provisional application No. 62/079,103, filed on Nov. 13, 2014.

(51) Int. Cl.
| | |
|---|---|
| *G06F 11/00* | (2006.01) |
| *H04L 29/06* | (2006.01) |
| *G06Q 10/06* | (2012.01) |
| *G06F 17/30* | (2006.01) |
| *G06F 12/14* | (2006.01) |

(52) U.S. Cl.
CPC ...... *H04L 63/1433* (2013.01); *G06F 17/3053* (2013.01); *G06F 17/30958* (2013.01); *G06Q 10/06315* (2013.01); *H04L 63/1441* (2013.01)

(58) Field of Classification Search
CPC .... G06F 21/55; G06F 21/577; G06F 19/3437; H04L 63/1425; H04L 63/1433; H04L 63/1441
USPC ....... 726/225, 23, 25; 706/12; 709/222, 223, 709/224, 227
See application file for complete search history.

(56) References Cited

U.S. PATENT DOCUMENTS

| | | | |
|---|---|---|---|
| 7,904,962 B1 * | 3/2011 | Jajodia | H04L 63/1425 709/223 |
| 8,001,017 B1 | 8/2011 | Franco | |
| 8,272,061 B1 * | 9/2012 | Lotem | G06F 21/577 709/223 |

(Continued)

*Primary Examiner* — Gary S Gracia
(74) *Attorney, Agent, or Firm* — Medley, Behrens & Lewis, LLC

(57) ABSTRACT

The various technologies presented herein relate to pertaining to identifying and mitigating risks and attacks on a supply chain. A computer-implemented representation of a supply chain is generated comprising nodes (locations) and edges (objects, information). Risk to attack and different attack vectors can be defined for the various nodes and edges, and further, based upon the risks and attacks, (difficulty, consequence) pairs can be determined. One or more mitigations can be generated to increase a difficulty of attack and/or reduce consequence of an attack. The one or more mitigations can be constrained, e.g., by cost, time, etc., to facilitate determination of how feasible a respective mitigation is to implement with regard to finances available, duration to implement, etc. A context-free grammar can be utilized to identify one or more attacks in the supply chain. Further, the risks can undergo a ranking to enable mitigation priority to be determined.

17 Claims, 10 Drawing Sheets

(56) References Cited

U.S. PATENT DOCUMENTS

| | | | |
|---|---|---|---|
| 8,516,594 B2 | 8/2013 | Bennett et al. | |
| 8,620,729 B2 | 12/2013 | Srinivasa et al. | |
| 8,881,288 B1* | 11/2014 | Levy | G06F 21/577 |
| | | | 709/225 |
| 9,619,772 B1* | 4/2017 | Adogla | G06Q 10/0635 |
| 2005/0193430 A1* | 9/2005 | Cohen | G06F 21/577 |
| | | | 726/25 |
| 2007/0192344 A1* | 8/2007 | Meier | G06F 8/10 |
| 2007/0226796 A1* | 9/2007 | Gilbert | G06F 21/55 |
| | | | 726/22 |
| 2008/0052780 A1* | 2/2008 | Cao | G06F 21/554 |
| | | | 726/23 |
| 2008/0133300 A1* | 6/2008 | Jalinous | G06Q 10/0635 |
| | | | 705/7.28 |
| 2008/0154679 A1 | 6/2008 | Wade | |
| 2009/0077666 A1* | 3/2009 | Chen | G06F 21/577 |
| | | | 726/25 |
| 2009/0228316 A1 | 9/2009 | Foley et al. | |
| 2009/0248488 A1* | 10/2009 | Shah | G06Q 10/0635 |
| | | | 705/7.28 |
| 2010/0095158 A1 | 4/2010 | Shah-Hosseini | |
| 2010/0153156 A1* | 6/2010 | Guinta | G06Q 10/0635 |
| | | | 705/7.28 |
| 2011/0071872 A1* | 3/2011 | Frantzve | G06Q 10/04 |
| | | | 705/7.28 |
| 2013/0226652 A1* | 8/2013 | Bilello | G06Q 10/0635 |
| | | | 705/7.28 |
| 2013/0333028 A1* | 12/2013 | Hagar | H04L 63/1416 |
| | | | 726/22 |
| 2014/0018949 A1* | 1/2014 | Linton | G06N 5/02 |
| | | | 700/99 |

\* cited by examiner

FRAMEWORK AND METHODOLOGY FOR SUPPLY CHAIN LIFECYCLE ANALYTICS

RELATED APPLICATION

This application claims priority to U.S. Provisional Patent Application No. 62/079,103, filed on Nov. 13, 2014, and entitled "FRAMEWORK AND METHODOLOGY FOR SUPPLY CHAIN LIFECYCLE ANALYTICS", the entirety of which is incorporated herein by reference.

STATEMENT OF GOVERNMENTAL INTEREST

This invention was developed under contract DE-AC04-94AL85000 between Sandia Corporation and the U.S. Department of Energy. The U.S. Government has certain rights in this invention.

BACKGROUND

The globalization of today's supply chains (e.g., information and communication technologies, military systems, etc.) has created an emerging security threat that could degrade the integrity and availability of sensitive and critical government data, control systems, and infrastructures. Commercial-off-the-shelf (COTS) and even government-off-the-self (GOTS) products are often designed, developed, and manufactured overseas. Counterfeit items, from individual chips to entire systems, have been found in commercial and government sectors. Supply chain attacks can be initiated at any point during the product or system lifecycle, and can have detrimental effects to mission success.

To date, there is a lack of analytics and decision support tools for analyzing supply chain security holistically, and for performing tradeoff analyses to determine how to invest in or deploy possible mitigation options for supply chain security such that a return on investment is optimized with respect to cost, efficiency, and security.

SUMMARY

The following is a brief summary of subject matter that is described in greater detail herein. This summary is not intended to be limiting as to the scope of the claims.

The various technologies presented herein relate to identifying one or more risks in a supply chain, determining susceptibility to an attack, and based thereon, determining one or more mitigations against the attack.

In an embodiment, a computer-implemented representation of a supply chain can be generated, wherein the representation comprises nodes and edges, a node represents a location in the supply chain and an edge represents an object or information transmitted between locations in the supply chain. Information can be acquired, e.g., by completion of a questionnaire by one or more subject matter experts, to facilitate understanding of one or more risks associated with any of the locations, information, and/or objects represented by the nodes and/or edges in the supply chain.

In a further embodiment, an algorithm(s) can be utilized to rank nodes (and thus locations in the supply chain) with respect to risk, wherein the ranking enables a determination to be made regarding which nodes and edges, and combinations of nodes and edges, might be most, and conversely least, susceptible to an attack. In an embodiment, a single node or edge may be the focus of more than one attack vector.

In a further embodiment, computer-implemented representations of potential attacks can be generated, and can be applied against a node(s) or an edge(s) in the supply chain graph. For example, for a collection of nodes and edges in the computer-implemented representation of the supply chain, an attack graph can be generated, wherein the attack graph is representative of a potential attack that is possible to be undertaken at the locations represented by the nodes and against the information or materials represented by the edges. Further, a pair of values that are representative of a consequence of the potential attack (from the perspective of the supply chain owner or defender) and the difficulty of the attack (from the perspective of the attacker) can be associated with the attack graph. To facilitate comparison between potential attacks, the respective consequence and difficulty values can be visually represented (e.g., plotted) on a chart, thereby providing an analysis with a visual indicator of relative risk of attacks. More specifically, the chart (which can be referred to as a relative risk chart) is a plot of attack consequence versus attack difficulty. Ideally, (difficulty, consequence) pairs will be located on the relative risk chart in a region of the chart corresponding to a high difficulty for an attack to occur and a low consequence if an attack did occur. However, some paths will have (difficulty, consequence) pairs that place them in a region of the chart corresponding to a low difficulty for an attack to occur and a high consequence if an attack did occur. Accordingly, to further assist an analyst in analyzing a supply chain, an attack mitigation can be defined and applied to nodes and/or edges in the representation of the supply chain. An assessment can then be made to determine the effect of each mitigation in its ability to disrupt an attack or render the attack less consequential.

In an embodiment, constraints can be applied to the list of possible mitigations, such that only mitigations that satisfy a particular criteria are presented as potential mitigation techniques. For example, a cost criteria can be applied, such that any mitigation presented as a potential mitigation has an implementation cost (e.g., monetary cost) below a defined cost. In another example, a time criteria can be applied, such that any mitigation presented as a potential mitigation has a time to implement that is within a defined duration.

The various embodiments presented herein can assist decision makers and stakeholders in performing risk-based cost-benefit prioritization of security investments to manage supply chain risk. A supply chain decision analytics framework can be applied to the supply chain representation. Particular aspects of the framework include a hierarchical supply chain representation, vulnerability and mitigation modeling, risk assessment and optimization.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
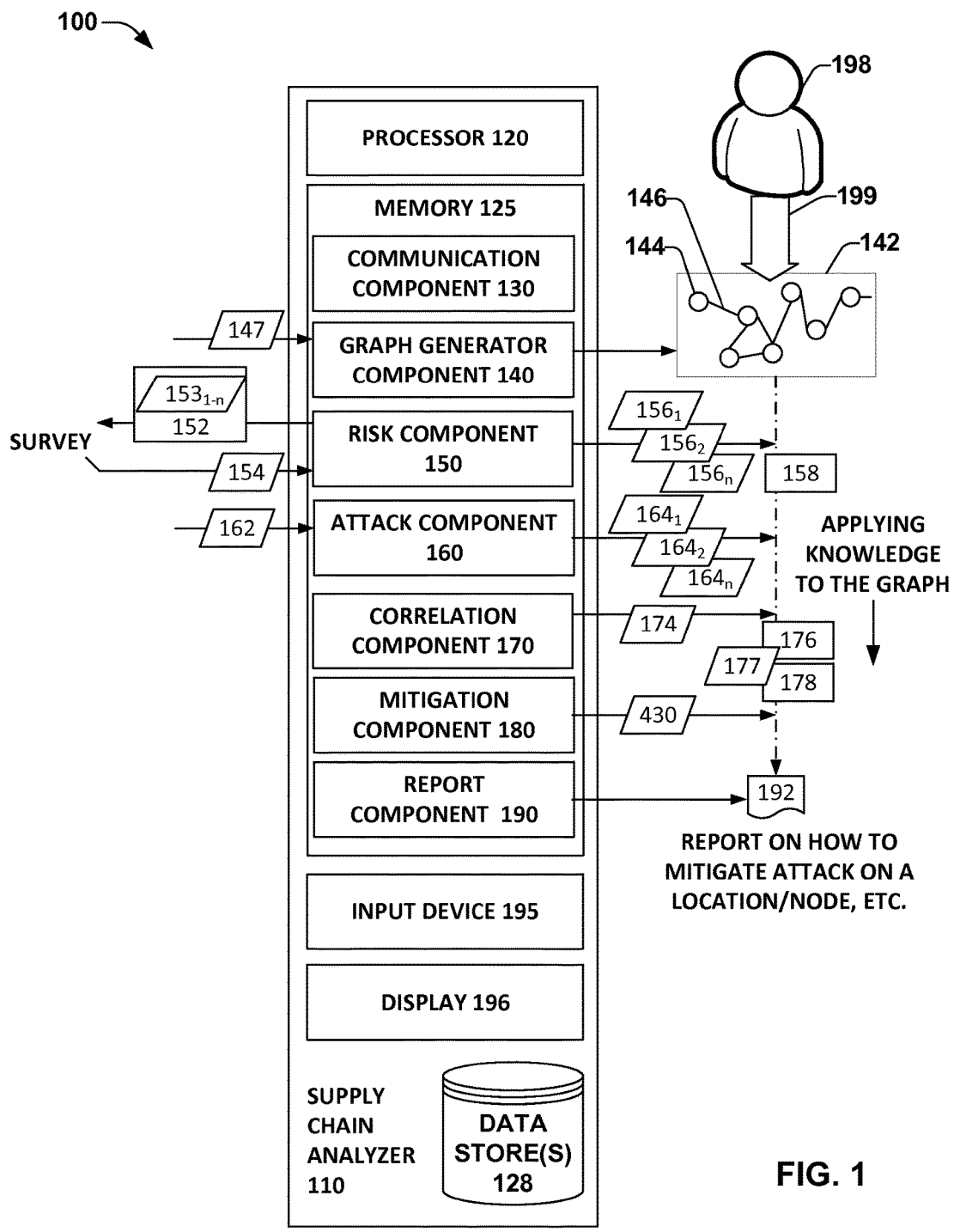
FIG. 1 is a block diagram of an exemplary computing system that is configured to identify risks and attacks on a supply chain, as well as mitigation techniques that can be used to thwart attacks and alleviate risk.

Various technologies pertaining to identifying risk, mitigating risk, identifying attacks, and mitigating attacks with respect to a supply chain are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used herein, the terms "component", "device", and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. The terms "component", "device", and "system" are also intended to encompass hardware configured to cause certain functionality to be performed, where such hardware can include, but is not limited to including, Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Further, the term "or" is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something, and is not intended to indicate a preference.

As previously mentioned, currently there is a lack of analytical and decision support tools available to analyze security across a supply chain, and to further perform tradeoff analyses to determine how to invest in, or deploy, possible mitigation options for supply chain security such that the return on investment (ROI) is optimal with respect to cost, efficiency, security, etc. The various embodiments presented herein relate to a supply chain decision analytics framework that can be utilized by decision makers and stakeholders (e.g., defenders of the supply chain) in performing risk-based cost-benefit prioritization of security investments to manage supply chain risk. To facilitate understanding, an overview of a framework for analyzing a supply chain is presented, including various components and devices that can be utilized during application of the framework. Greater detail will then be provided, per sections 1. hierarchical representation of the supply chain, 2. adversary modeling and formal description of potential adversary behavior, 3. risk assessment and visualization, and 4. constrained optimization to prioritize security investments. Section 5 provides a description of one or more methods than can be utilized to rank supply chain locations with respect to risk.

FIG. 1 illustrates a system 100 that can be utilized to analyze one or more risks in a supply chain, determine one or more attacks that can be conducted against the supply chain, and, based upon a risk assessment, how to adjust one or more elements of the supply chain to mitigate the chance of an attack (e.g., in accordance with one or more constraints), and further, if an attack is to occur, where feasible, mitigate any deleterious effects of the attack upon the supply chain and/or a product of the supply chain.

In the exemplary embodiment presented in FIG. 1, system 100 includes a supply chain analyzer system (SCAS) 110. The SCAS 110 can be any of a personal computer, a computer tablet, a laptop computer, a portable computing device, a mobile phone, a cellphone, a smartphone, a personal digital assistant (PDA), a server, a combination of computing devices, etc.

The SCAS 110 comprises a processor 120 and memory 125, wherein the memory 125 comprises data that is accessible to the processor 120 and instructions that can be executed by the processor 120. A data store 128 can store data utilized by one or more components included in the SCAS 110. With more particularity, the SCAS 110 can include a communication component 130, wherein the communication component 130 is configured to communicate with one or more devices (e.g., a locally located computer device, a remotely located computer device, etc.), wherein data can be received from an external device communicatively coupled to the SCAS 110, and further, data can be transmitted to the external device. Communication can be via any suitable technology, e.g., a computer network, cellphone technology, satellite technology, etc.

Figure 2:
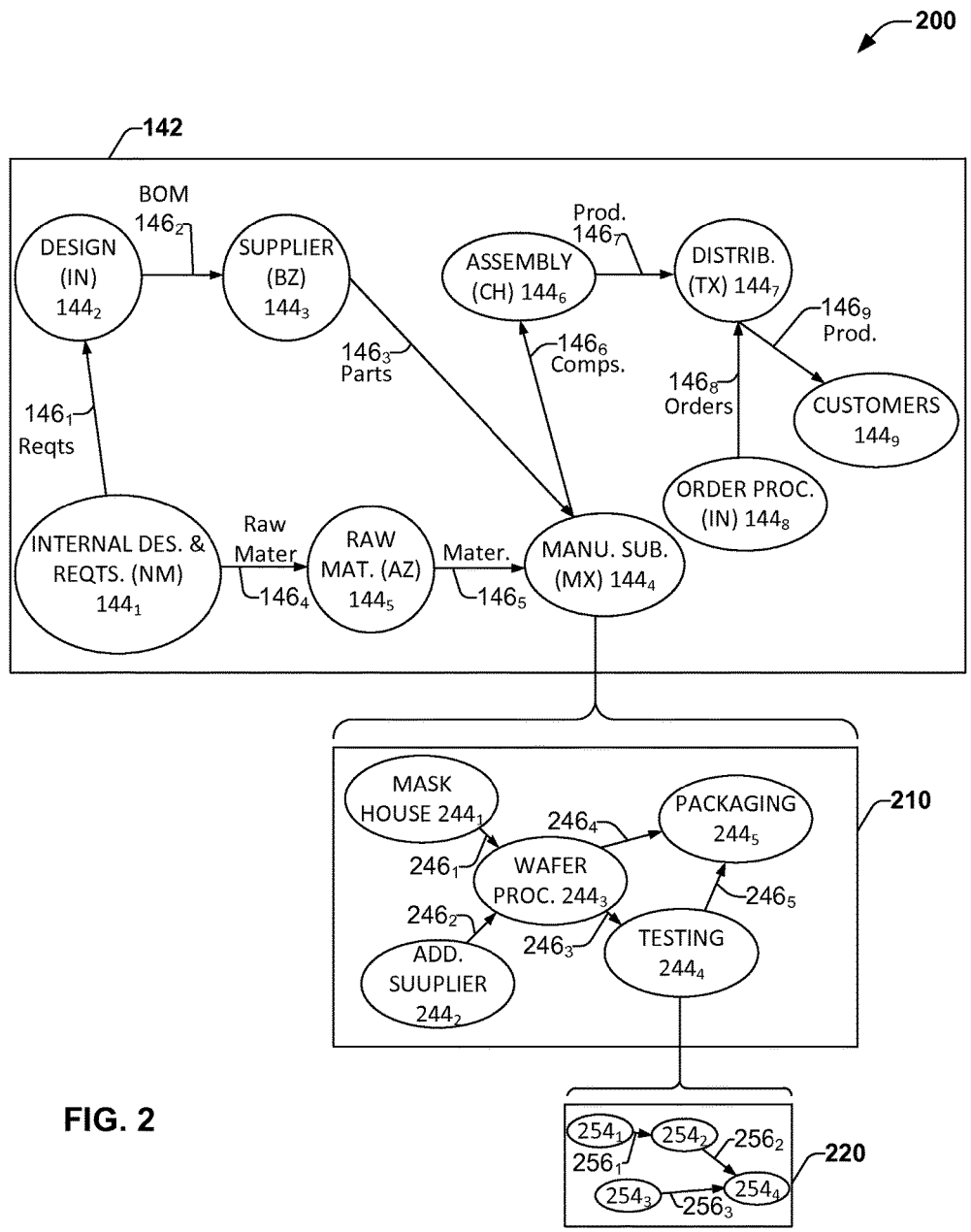
FIG. 2 illustrates a hierarchical graphical representation of a supply chain, according to an embodiment.

The memory 125 can further comprise a graph generator component 140 that is configured to generate and analyze a supply chain graph (SCG) 142 (which can be retained in the memory 125 and/or the data store 128). As described further herein, a SCG 142 can include a plurality of nodes $144_{1-n}$, and edges $146_{1-n}$, wherein n is a positive integer, and where n need not be the same value for both the nodes 144 and edges 146. A node 144 is representative of a location, wherein the location can be a physical location or a logical location. For example, the node 144 can represent the physical location of a facility (e.g., design shop, manufacturing plant, shipping departure point, shipping receiving point, etc.) that pertains to one or more objects, activities, etc., in a supply chain (for which the SCG 142 has been developed). In another example, the node 144 can represent a logical location, such as a process step (e.g., "design phase" can be represented by the node 144). Further, an edge 146 is representative of an object (or property thereof), information, the activity, etc., pertaining to the one or more nodes $144_{1-n}$. In an embodiment, the nodes and edges can be considered to be "features" of the SCG 142, and accordingly, when an attack is being formulated for application against the SCG 142, until a particular node(s) or edge(s) has been identified as a focus of the attack, the attack can be considered to be being undertaken against a feature(s) of the SCG 142. A hierarchical SCG 142 is illustrated in FIG. 2, and is described further herein.

In an embodiment, the graph generator component 140 can receive one or more items of data 147, wherein the data 147 can be information describing any of the locations, objects, activities, etc., illustrated in the SCG 142. The data 147 can be received from any suitable source, e.g., a subject matter expert, a designer(s), an engineer(s), a supplier(s), technical literature, supplier specifications, etc. The graph generator component 140 constructs the SCG based upon such data 147.

The memory 125 further comprises a risk component 150 which is configured to identify one or more risks pertaining to any of the locations, objects, activities, etc., represented in the SCG 142. In an embodiment, the risk component 150 can identify the risks based upon answers to questions in a questionnaire 152 (e.g., a survey) received from subject matter experts, facility operators, or the like. The questionnaire 152 comprises a plurality of questions $153_{1-n}$, wherein the questionnaire 152 can be provided to a person having knowledge of a particular node 144 and/or edge 146 in the supply chain (e.g., a subject matter expert). The questions $153_{1-n}$, can be about any subject pertaining to the supply chain, e.g., security of a location, number of employees at a location, machines at a location, etc. In response to answering the questionnaire 152, the person can generate a response 154, which includes information (e.g., answers to questions $153_{1-n}$) regarding a particular node $144_{1-n}$, and/or edge $146_{1-n}$. In an embodiment, the risk component 150 can be further configured to generate one or more risks $156_{1-n}$ pertaining to any of the respective nodes $144_{1-n}$, and/or edges $146_{1-n}$, wherein the risks $156_{1-n}$ are generated based upon the response(s) 154. Further, once the respective risks $156_{1-n}$ have been determined, they can be ranked, wherein one or more ranking methods can be utilized, as described in section 5, below. While only one questionnaire 152 is shown in FIG. 2, it is to be appreciated that a plurality of questionnaires 152 can be generated, wherein a first questionnaire can be directed to a first node, a second questionnaire can be directed to a second node, a third questionnaire can be directed to a first edge, etc. The risks computed by the risk component 150 allow for nodes and/or edges to be ranked with respect to the risks computed therefor.

As described further, a risk chart 158 can be generated by the risk component 150, wherein the risk chart 158 presents the various risks $156_{1-n}$ generated for respective nodes $144_{1-n}$ and/or edges $146_{1-n}$. The risk chart 158 can further present ranking information and data pertaining the nodes $144_{1-n}$, edges $146_{1-n}$, and/or risks $156_{1-n}$, as further described. In an embodiment, it is preferred that the SCG 142 comprises a plurality of nodes $144_{1-n}$ and/or edges $146_{1-n}$ having a high difficulty of an attack combined with a low consequence (or effect) from an attack. Accordingly, the one or more embodiments presented herein can be directed towards increasing an attack difficulty from a low level of difficulty to a high level of difficulty, and further decreasing a consequence of an attack from a high consequence to a low consequence.

An attack component 160 is further included in the SCAS 110, wherein the attack component 160 can be configured to receive attack data 162. The attack component 160 can apply attack paths to the SCG 142 based upon the attack data 162, wherein an attack path is a sequence of actions that are included in an attack, and which can occur at different locations in the supply chain represented by the SCG 142 (and thus the attack path can be applied across numerous nodes and/or edges in the SCG 142). Additional details pertaining to attack graphs are set forth below. In an embodiment, attack data 162 and attacks $164_{1-n}$ can be generated based upon a context-free grammar, as further described below.

A correlation component 170 can be utilized to determine attack susceptibility at the various nodes and edges based upon correlating the risks $156_{1-n}$ with the attacks $164_{1-n}$. The correlation component 170 can be further configured to determine and/or generate one or more correlations 174 based upon correlating the risks $156_{1-n}$ with the attacks $164_{1-n}$. In an embodiment, the correlation component 170 can generate a plurality of attack graphs 176 based upon the one or more correlations 174 between the risks $156_{1-n}$ and attacks $164_{1-n}$.

Figure 3:
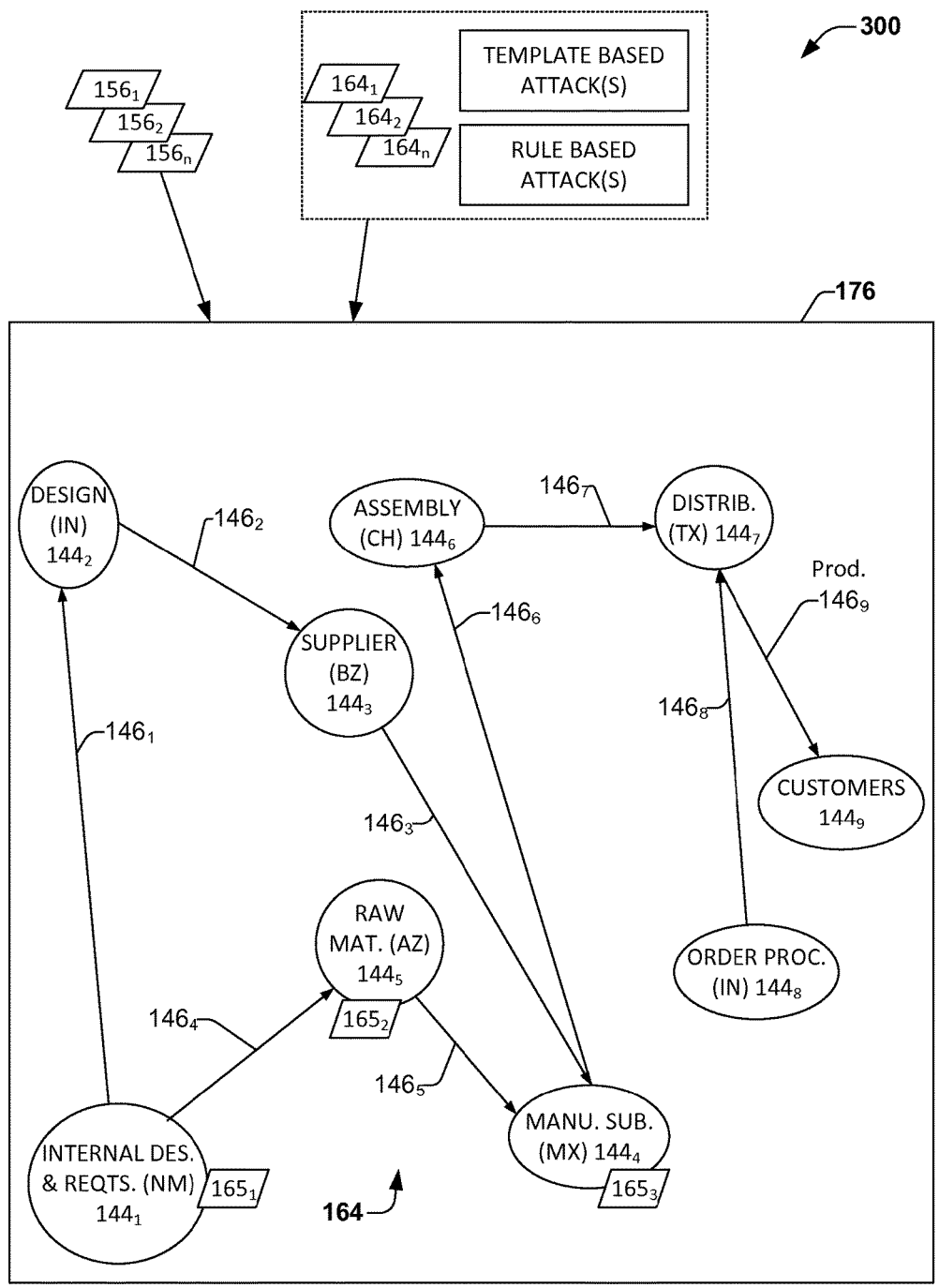
FIG. 3 illustrates an attack graph, which is a computer-implemented representation of an attack that can be conducted at a point in a supply chain, according to an embodiment.

FIG. 3 is a schematic 300 that illustrates an exemplary SCG 300 having been updated to represent a potential attack on the supply chain. An attack, as used herein, can be a combination of attack actions that can be undertaken at a location or across locations in the supply chain. The exemplary SCG 300 includes nodes $144_1$-$144_9$ and directed edges $146_1$-$146_9$. Action can be considered a portion of an attack; therefore, for example, an attack action can form a portion of an attack. As shown in FIG. 3, several nodes $144_1$-$144_3$ can have attack actions $165_1$-$165_3$ respectively applied thereto, wherein the attack actions $165_1$-$165_3$ collectively form an attack 164 on the supply chain represented by the SCG 300. Described in greater detail below are mechanisms for identifying appropriate attack actions that are applicable to nodes, and appropriate attack action/node combinations that can be combined to form an attack. Once the attack is represented in the SCG 300, the SCG 300 can be analyzed to identify a location or combination of locations in the supply chain that are associated with high risk, and to further identify potential attacks that may be associated with such locations. In an example, a <difficulty, consequence> pair can be applied to an attack, where the "difficulty" value is indicative of a difficulty in an attacker implementing the attack at a certain location or locations, while the "consequence" value is indicative of a level of damage that will be effectuated on the supply chain if the attack were to be successfully implemented. As described below, these <difficulty, consequence> pairs can be applied to an attack in general, although in another embodiment, such a pair can be applied to an individual attack action.

Figure 4:
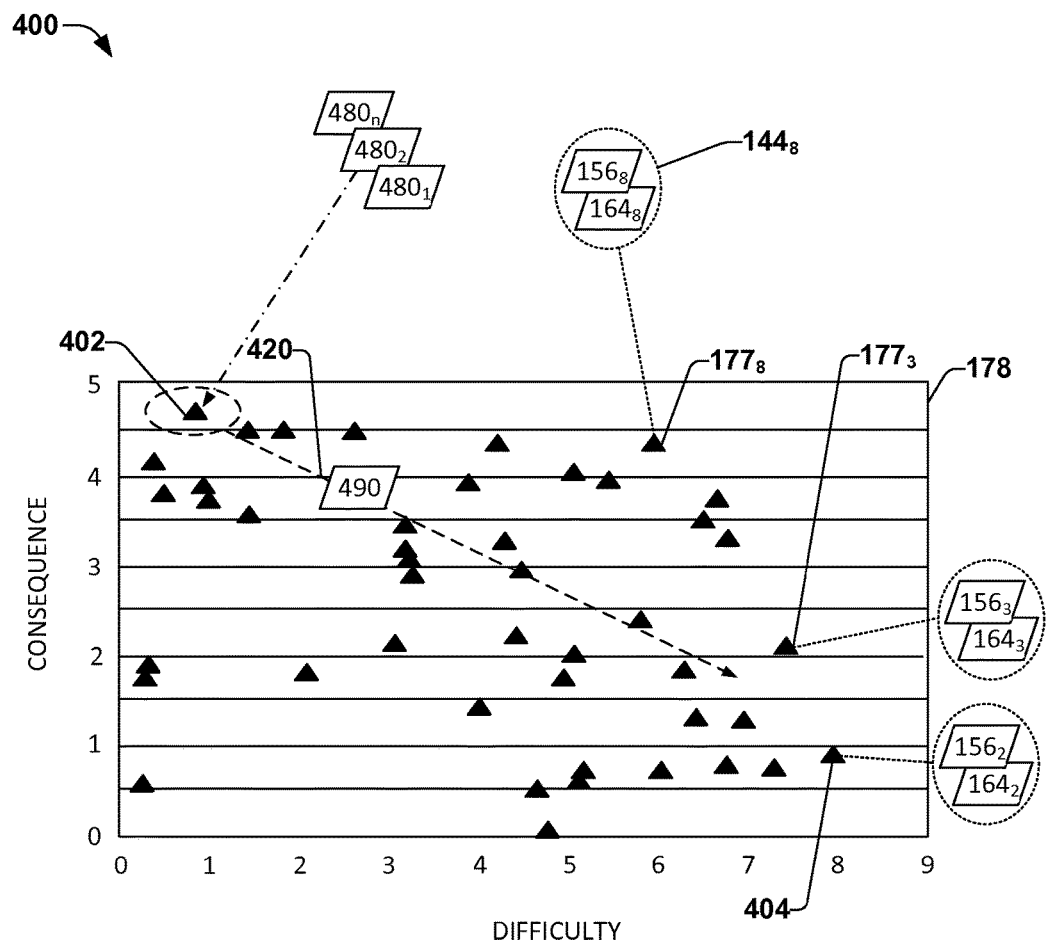
FIG. 4 illustrates a relative risk graph, according to an embodiment.

Turning to FIG. 4, a <difficulty, consequence> pair $177_{1-n}$ can be plotted on a relative risk chart 178, where each pair is indicative of a difficulty in implementing a particular attack and a consequence if the attack is successfully implemented. For example, the attack 164 can be represented by plot point 402, which indicates that the attack 164 is associated with a low level of difficulty to implement, yet a high level of consequence. This would indicate to a defender of the supply chain that the potential attack 164 should be further investigated, including identifying locations, objects, information, etc. that are subjected to the potential attack 164. Plot point 404 represents another potential attack on the supply chain, where the another potential attack has a high level of difficulty and a low level of consequence, indicating to the defender of the supply chain that other potential attacks should be investigated prior to the attack represented by the plot point 404. In another embodiment, the plot points on the risk chart 178 can represent nodes in the SCG 142, where the nodes are plotted based upon at least one <difficulty, consequence> pair for an attack that includes an attack action on the nodes. In such an embodiment, the defender of the supply chain can relatively quickly identify nodes in the supply chain that are at risk, and mitigation steps for thwarting the attack (or an individual attack action included in the attack) can be investigated. As described herein, the SCAS 110 can automatically identify potential mitigation techniques, and can further output information that is indicative of expected effect of the mitigation techniques on attacks or attack actions, wherein the SCAS 110 can perform the aforementioned functionality based upon the attack that is being mitigated.

Returning to FIG. 1, the memory 125 further comprises a mitigation component 180 which can be utilized to generate the one or more mitigations $430_{1-n}$ which, in conjunction with the relative risk chart 178, can be utilized to reduce a consequence of an attack and/or increase a difficulty for an attack to occur, thereby reducing the likelihood of an attack and further, if an attack does occur, reducing the consequences of the attack.

A report component 190 is included in the memory 125 and is configured to generate one or more reports 192, wherein the one or more reports 192 can include information sourced from any data that is processed and or generated by one or more components and/or devices included in the SCAS 110. For example, the one or more reports 192 can present information pertaining to any of the SCG 142, the plurality of nodes 144, the plurality of edges 146, the node/edge data 147, the questionnaire 152, the one or more risks $156_{1-n}$, the attack data 162, the applied attacks $164_{1-n}$, the one or more correlations 177, the one or more mitigations $430_{1-n}$, etc.

To facilitate interaction with the SCAS 110, an input device 195 can be utilized to enter information, draw or edit the SCG 142 (e.g., arrange the various nodes and edges), etc. And to further enable the interaction, a display device 196 can be included in the SCAS 110 to enable presentment of the SCG 142 and any information pertaining thereto.

As shown in FIG. 1, per the previous description, an adversary 198 is, or may be, conducting an attack 199 against the supply chain represented by the SCG 142, and the various embodiments presented herein are directed towards preventing the attack 199 from occurring in the first place and/or mitigating the effects of an attack 199 if it does occur.

1. Hierarchical Supply Chain Representation

As mentioned, a graph generator component 140 can generate and analyze the SCG 142, wherein the SCG 142 includes a plurality of nodes 144 and edges 146. FIG. 2, supply chain model 200 illustrates a SCG 142. The graph generator component 140 can generate the SCG 142 based, at least in part, upon information entered at the input device 195 (e.g., data 147 describing any of the locations, objects, activities, etc., to be illustrated in the SCG 142). The SCG 142 can be a directed graph representation of a supply chain, wherein the supply chain comprises the plurality of nodes $144_{1-9}$ and the plurality of edges $146_{1-9}$. In the exemplary SCG 300 shown in FIG. 3, nodes $144_{1-9}$ can represent (physical or logical) locations involved in the production of an item of interest. For example, respective nodes $144_{1-9}$ can represent suppliers, distributors, manufacturers, etc. Directed edges $146_{1-9}$ in the SCG 300 can represent the flow of information or an object(s) through the supply chain. For example, e.g., internal design and requirements $144_1$ is located in New Mexico and generates set of requirements (represented by edge $146_1$) that are provided to a design house $144_2$ located in India. The design house $144_2$ generates a bill of materials (represented by edge $146_2$) for a supplier $144_3$ located in Brazil. The supply chain represented by the SCG 300 continues through to products (represented by edge $146_7$) being received at a Texas based distributor $144_7$, who, in response to orders $146_8$ generated by order processing $144_8$ located in India, products $146_9$ are shipped to the customers $144_9$.

The SCG 300 (and 142) can be a hierarchical representation, such that it includes as much detail as is available or desired to enable attack analysis and mitigation generation. If minimal information is known about a particular node or edge, then an abstract representation may be used. For example, at this level of detail, a node may simply be described as a supplier located in a particular country (e.g., supplier $144_3$ in Brazil). However, when more information is available, and if a more detailed analysis is desired, then the information can also be included in the SCG 142. For example, while the SCG 142 is the highest level representation of the supply chain, a middle level representation SCG 210 can be generated. In the example shown, the SCG 210 provides information detail for the Mexico-based manufacturing subsidiary $144_4$. As shown, information regarding the various operations performed at the manufacturing subsidiary $144_4$ can pertain to manufacture of an integrated circuit, e.g., node $244_1$ is masking, node $244_3$ is wafer processing, etc. And as previously described, each node $244_{1-5}$ has an associated edge, any of edges $246_{1-5}$, where the edges provide further detail about an information or object(s) generated and/or processed at the manufacturing subsidiary $144_4$. If greater detail is known about a particular operation at the manufacturing subsidiary $144_4$, this can be further represented in a lower level representation SCG 220. For example, SCG 220 presents information nodes $254_{1-3}$ and edges $256_{1-3}$ regarding the testing operations $244_4$ performed at the manufacturing subsidiary $144_4$. Any number of SCG layers, nodes, and edges can be utilized as required to present the information known about the supply chain represented by SCG 142. By utilizing one or more levels of SCGs 142, 210, 220, detailed representation(s) of the internal processes of the particular manufacturer(s), supplier(s), etc., involved in a supply chain can be represented.

To facilitate understanding of potential risks upon one or more nodes and/or edges of the SCG 142, answers to questions in the questionnaire 152 can be provided to the risk component 150, and assigned to appropriates nodes (e.g., any of $144_{1-n}$, $244_{1-n}$, $254_{1-n}$) and/or edges (e.g., at any of $146_{1-n}$, $246_{1-n}$, $256_{1-n}$). One or more responses 154 received at the risk component 150 can be analyzed by the risk component 150 and, based thereon, the one or more risks $156_{1-n}$ can be generated, wherein any of the risks $156_{1-n}$ can be directed to a particular node and/or edge, or a plurality of nodes and/or edges.

2. Adversary Modeling and Formal Description of Potential Adversary Behavior

With the SCGs 142, 210, 220, and 300, and information represented thereon, adversary modeling and description of potential adversary behavior can be conducted, e.g., by the attack component 160. As previously mentioned, the attack component 160 can receive attack data 162 which can be utilized to determine a probability of attack relative to a location or locations in the supply chain and/or between locations in the supply chain, how susceptible the supply chain is to an attack at a collection of locations and/or between location, etc. Based upon the attack data 162, the attack component 160 can apply one or more attacks to the SCG 142. In an exemplary embodiment, a formalized, streamlined approach for representing locations, objects and adversary activities in a supply chain is presented. The supply chain representation SCG 142 and one or more behaviors of the adversary 198 can be expressed at any level of detail that is available or desired. At the most abstracted level, generalized actions can be represented, e.g., by a context-free grammar. For an adversary 198, these actions can include, but are not limited to:

a. Acquire
b. Modify
c. Delay
d. Inject
e. Circumvent

The list of actions form a set of actions, and by utilizing the context-free grammar, a subset of actions are defined, to be applied against one or more node(s) or edge(s) based upon the ability for a node or edge to satisfy one of the actions in the subset of actions, wherein the subset of actions form an instance of an attack. As described further herein, if an attack requires a particular part to be acquired, then with reference to FIG. 2, this attack cannot occur at any of nodes $144_1$, $144_2$, $144_5$, $146_5$, or edges $146_1$, $146_2$, $146_4$, and/or $146_5$, as parts do not occur in the SCG 142 until node $144_3$, edge $146_3$. These high-level actions and/or activities can be expanded to provide more detailed descriptions of actions within the supply chain SCG 142. Providing more detailed descriptions can be beneficial, where, as more information becomes available/is presented about any of the supply chain, a mitigation option(s), an adversary 198, etc., then a specific analysis can be conducted. For example, an "acquire" attack operation 164 of an adversary 198 can be expanded as follows:

a. Acquire
  (1) Insider
    i. Recruit insider
  (2) Intercept
    i. Transport
    ii. Communications Here, a goal of the adversary 198 is to acquire some object or information. To do so, the adversary 198 may first acquire an insider by recruiting an insider (e.g., an insider at a particular node $144_{1-n}$ in the SCG 142) to the adversary's organization. Alternatively, the adversary 198 may also acquire something by intercepting it during transportation, or in the case of information, by intercepting communications (e.g., capture an object during transportation or transmission at an edge $146_{1-n}$). Each of these activities can be further expanded to provide a greater richness of detail. After devising this set of potential attack actions by an adversary 198, any desired level of detail can be used in the subsequent analysis. Such an approach enables the various embodiments presented herein to easily accommodate various levels of detail. When detailed information is available, it can be included in the analysis, but when little information is available, more abstract, generalized descriptions can be used. It is still possible make meaningful, relative comparisons of attack paths and mitigations when the representation is abstract. Additionally, when little is known about a part of the supply chain, a worst-case model can be utilized, or a model based on similar parts of other supply chains.

Given a suitable description of adversary behaviors $164_{1-n}$, a method for describing attacks that can occur within the supply chain represented by the SCG 142 is defined. Per the various embodiments presented herein, an adversary can perform a sequence of actions (e.g., attack actions) on objects (e.g., any of edges $146_{1-n}$) at various locations (e.g., any nodes $144_{1-n}$) in the SCG 142 that they may apply to achieve a particular goal. These sequences are termed "attack graphs" or "attack sequences" herein. A defender (e.g., a business associated with one or more nodes and/or edges of the SCG 142), meanwhile, is concerned with applying mitigations at appropriate locations to disrupt or complicate adversarial actions that negatively impact the defender's goals, and preferably do so with limited monetary and temporal resources. To achieve a broad understanding of the adversary's options, an automated method for generating these attack graphs can be utilized. Humans cannot adequately perform such a task due to the large number of potential attack graphs generated, and further, because the human-generated attack graphs may be subjective and shaped by the experience of the human, knowledge possessed by the human, and personal opinions of what constitutes reasonable attacks.

Per the various embodiments presented herein, two exemplary methods for generating attack graphs from the SCG 142 in a systematic way and corresponding collection of potential adversarial actions can be utilized. The following discussion is made with reference to the supply chain model SCG 142 presented in FIG. 2.

In a first method, a template-based approach is utilized wherein one or more templates to describe a feasible attack(s) $164_{1-n}$ are initially designed. The templates are subsequently applied to the SCG 142 to generate one or more specific attack graphs. For instance, an example list of templates may be as follows:

(i). Steal Schematic→Functional Change to Schematic→Inject modified Schematic: consequence=hardware Trojan.

(ii). Steal Bill of Materials→Inject counterfeit products: consequence=clones exist.

(iii). Steal products→functional change to products→inject modified products: consequence=hardware Trojan.

(iv). Steal layout→quality change to layout→inject modified layout: consequences=degraded quality.

An individual template can be utilized to create one or more specific attack graphs. For instance, when utilizing template (i), specific attacks can be created in reference to the SCG 142:

(a). Steal schematic at node $144_2$→functional change to schematic→inject modified schematic at $144_2$.

(b). Steal schematic at $144_2$→functional change to schematic→inject modified schematic at $144_4$.

With templates in-hand, the attack graph 176 can be generated using the following algorithm. For each attack template, each node $144_{1-n}$ in the SCG 142 is considered. At each node, a determination as to whether an attack can begin (initiate) at that node is made, wherein the determination can be based at least in part upon whether one or more appropriate objects (e.g., as determined for any edge $144_{1-n}$) are present at the node. In response to determining that an attack can begin at a particular node, then the SCG 142 can be traversed from that particular node searching for one or more attack paths through the SCG 142 where the remainder of steps in the attack template can be applied.

In an embodiment, more than one attacker action can be applied to a single node in the SCG 142. The first example attack (a) presented above is an example of such an approach, where the attacker 198 steals something and injects modified objects at a single node $144_2$. In another embodiment, an attacker can perform no action at an intermediate node(s) in the SCG 142 while continuing the attack template at a later node(s). In the second example, attack (b) presented above is an example of such an approach, where the attacker 198 steals an object at $144_2$ and takes no action in node $144_3$, but injects subverted objects at node $144_4$.

In a second method, a rules-based approach is utilized, wherein an attack graph(s) 176 is generated from a list of adversary actions based upon a set of rules. The following presents an exemplary, non-limiting set of rules based upon the previously presented reduced adversary alphabet of 'acquire', 'modify', 'delay', 'inject', 'circumvent', wherein the exemplary rules are:

i. If {acquire object} has occurred then {modify object} is allowed.
   ii. If {acquire object} has occurred then {delay object} is allowed.
   iii. If {modify object} has occurred then {inject object} is allowed.
   iv. All attacks begin with 'acquire'.
   v. all attacks end with 'delay' or 'inject'.
   vi. If 'modify' occurs then 'inject' must occur.
   vii Parent-child expansions are only permitted when the action and parent appear at the end of the attack.
   viii. No repetitions of (action, object) pairs are allowed.
   ix. Attacks are identical under permutations of their order.
   x. If (action, parent) has occurred then allow (action, child).

Parent-child relationships emerge (e.g., per rule x) because some combinations of an action and an object imply the completion of another (action, object) pair. For example, an adversary 198 that acquires the bill of materials (bom) $146_2$ for a product has implicitly acquired the parts $146_3$ that compose the product $146_9$, since, given the bill of materials $146_2$, the adversary 198 can procure the parts $146_3$ outside of the product's supply chain SCG 142. The parent-child relationships are defined as (action, parent, child) triples. In the example SCG 142, such (action, parent, child) triples can be, but not limited to:

i. (acquire,BOM,parts)
   ii. (modify,parts,product)
   iii. (delay,orders,product)
   iv. (delay,layout,product)
   v. (delay,schematic,product)
   vi. (delay,BOM,product)
   vii. (delay,parts,product)
   viii. (delay,requirements,BOM)
   ix. (delay,requirements,schematic)
   x. (delay,requirements,layout)
   xi. (delay,requirements,product)
   xii. (delay,BOM,parts)

In both the template-based approach and the rules-based approach to attack generation, a "validation point" can be defined as a location in which there is a process step that validates an earlier step. Each location (e.g., any of nodes $144_{1-n}$, $244_{1-n}$, $254_{1-n}$) in the supply chain graph may be or may have a validation point, for example, one or more operations performed at the testing station $244_4$ can validate correct fabrication has been performed at the wafer processing location $244_3$. In another example, assembly location $144_6$ can act as a validation point for raw materials $144_5$ (e.g., do the materials $146_4$ and/or $146_5$ have expected properties?). The validation point definition enables representation of situations where the defender may discover earlier changes that an attacker 198 has made to an object. For example, a watermark for a finite-state machine (FSM) may not appear if any part of the machine's description has been modified. This discovery would allow the defender to stop an attack in progress and take action before consequences occur. However, the attacker 198 can also subvert the validation point and get by with the earlier change undetected. Continuing the water mark example, the attacker 198 might be able to subvert the validation process or somehow defeat the watermark. Therefore, when validation points exist, the attacker can also take a "circumvent" action at a validation point and then continue the remainder of the attack template.

Once the various attack paths and consequences have been established, the SCG 142 can be updated to indicate entry point (e.g., an acquire node) and consequence (attacker goal) nodes (e.g., an inject node), wherein the updated SCG 142 can be presented to an entity attempting to identify supply chain risks and potential attacks upon a supply chain. A decision can be made regarding which part of the product lifecycle an object (e.g., any of $146_{1-n}$) belongs to in order to decide the entry point. For example, the product's schematic may be at risk because the implementation phase was outsourced. This entry point could be called an "opportunity" or an "enabling circumstance" for the attacker. Other definitions for entry points on the attack graph 176 can be equally valid. As for the consequence nodes, the specific end state can define the consequence for the defender. For example, there could be a subverted product at the distributor, or worse, a subverted product which was delivered to a customer. For the rule-based approach, further rules can be used to define the entry and consequence nodes of the attack graph.

In both of the template-based and rule-based approaches, adversaries 198 are performing an action(s) on an object(s) at a specific location(s). The templates or rules can then be used to generate attack graphs 176 by allowing actions to occur on objects wherever in the supply chain they exist. For some actions, such as 'modify', the adversarial activity may occur outside of the supply chain, and so there is no associated location. This characteristic was revealed in the prior example, wherein the adversary 198 stole a schematic from the design house, modified it (with no associated location), and then injected (inserted) the modified schematic at the design house or, in a second attack graph, injected the schematic at the manufacturer.

With both the template-based and rule-based approaches, the generated attack graphs can be pruned using various criteria, which can be utilized for adversarial modeling. For instance, a defender may only be interested in deterring adversaries whose capabilities are below some threshold, and will accept an exposure to more capable adversaries. Accordingly, the attack graphs 176 can be reduced to include only the subset of attacks 164 that are available to the adversaries of interest.

3. Risk Assessment and Visualization

Given a representation of the supply chain (e.g., SCG 142) and a suitable method for representing adversary behaviors within it, in a further embodiment, one or more risks $156_{1-n}$ of a supply chain attack can be analyzed in conjunction with an attack(s) 164, and presented to enable visualization of the risk(s) to aid a decision maker(s) associated with the risk. In an embodiment, risk can be represented utilizing the <difficulty, consequence> pairs $177_{1-n}$ referenced above. In this embodiment, each attack path (e.g., the respective nodes and edges pertaining to a template-based attack and/or a rule-based attack) can be assigned a <difficulty, consequence> pair in order to assess a risk associated therewith. This approach eliminates the need to consider the likelihood or probability of a specific attack and rather, focuses on only the difficulty (or the ease) and the consequences of an attack. To enable visualization of the supply chain risk(s), the <difficulty, consequence> pairs $177_{1-n}$ can be plotted for all attack paths. As described previously, FIG. 4 presents a relative risk chart 178 that is compiled for a plurality of difficulty and consequence measures $177_{1-n}$ for a plurality of attacks $164_{1-n}$ (and respective risks $156_{1-n}$) on a supply chain (e.g., based upon SCG 142). As shown, low difficulty, high consequence attacks (e.g., $177_4$) in the upper left quadrant will generally be of most concern to a defender, while the highly difficult, low consequence attacks (e.g., $177_2$) in the lower right quadrant will likely be of least concern.

Presentation of the difficulty and consequence measure for an attack as part of a supply chain risk analysis is amenable to visualization of the impact of various supply chain mitigations. An individual mitigation can impact some subset of the potential adversarial attack graphs by changing the difficulty of the attack, the consequence of the attack, or both. Decision makers can observe this impact by seeing how the position of respective points representing the (difficulty, consequence) pairs $177_{1-n}$ from individual attack graphs shift in response to proposed mitigation strategies.

4. Constrained Optimization to Prioritize Security Investment(S)

Once the relative risk chart 178 has been generated, an effect of one or more mitigation techniques $480_{1-n}$ against an adversarial action(s) can be presented, e.g., to provide decision support. In an embodiment, an indicator(s) 490 (e.g., on mitigation line 420) can be provided to identify an extent to which a proposed mitigation 490 will impact the adversary's operational environment or adversarial behavior, for example, by increasing the difficulty for an adversary 198 to complete an attack or by decreasing the defender's consequences of a successful attack. An indication of other factors such as the cost and time required to implement the mitigation can also be presented, as such factors can directly help to shape one or more mitigation strategies $480_{1-n}$. Using the other parts of the framework, the supply chain representation can be updated once mitigations have been mapped and applied, and new attack paths can be generated. These new attack paths can be compared to the pre-mitigation attack paths to assess the mitigation impacts.

During the establishment of one or more mitigation strategies 480, defender actions to be performed at locations (e.g., any of nodes $144_{1-n}$) or on objects (e.g., any of nodes $146_{1-n}$) can be identified. Defender actions change the properties of a location or an object. For example, a defender may have the control to add more security staff at a location, making it harder to force entry, or use overnight shipping of an object in transit, giving the attacker 198 less time to execute an attack.

Having the appropriate information associated with each location and object is crucial to support analysis that leverages this supply chain representation. For locations, some example attributes include:
 1. Security of the facility.
 2. Integrity of personnel.
 3. Amount of time location has been operational or in business.
 4. Amount of time objects or information is retained.
 5. Amount of time between when an object is received and a product object is first delivered.

For objects, some example attributes are:
 1. Reverse-engineering difficulty.
 2. Level of provenance (expressed as, e.g., the probability that an object is what it seems to be).
 3. Complexity (e.g., number of transistors, sub-components, etc.).

It can be desirable for approaches for mapping mitigations 480 onto the supply chain and adversary actions within it, to require limited human input, as supply chain problems may be so large and complex that they quickly become overwhelming, and that they help to eliminate subjectivity so that, for instance, the impact of a particularly popular or new mitigation is not artificially inflated. This issue can be addressed by any suitable technique, two such embodiments to this problem are:

4.1. Apply mitigations to objects or locations within the supply chain

In this embodiment, a first set of attributes can be utilized to describe locations $144_{1-n}$ within the supply chain, and a second set of attributes to describe the objects $146_{1-n}$, which may be informational or physical, that flow through the supply chain. Each object and location is assigned a score for each attribute. This set of scores can comprise an understanding of the object or location for analysis purposes.

Further, supply chain mitigations $480_{1-n}$ can be applied directly to objects or locations. The mitigations $480_{1-n}$ themselves can be defined by the impact that they have on the attributes of the object $146_{1-n}$ or location $144_{1-n}$ to which they are applied. For example, attributes for a physical location may include the security level of the building, the amount of time it would take to acquire physical access, the size of the work force, the number of insiders that would need to be recruited, the cost of equipment or training required to gain access, etc. A specific mitigation to such an attack, such as installing an alarm system, would likely raise the security level of the building and, consequently, the cost of gaining entry.

4.2. Map mitigations to adversary actions

In this embodiment, a mitigation action(s) $480_{1-n}$ can be mapped to the adversary action(s) 164 that they would impact, and an estimate generated to an extent with which the mitigation action(s) would impact the adversary action(s). Each generalized mitigation action 480 can be assigned to a set of generalized adversarial actions $164_{1-n}$ that the mitigation action might impact. Further, a maximum strength can be assigned, wherein the strength indicates a degree with which each mitigation category can impact each adversarial action category. Next, each specific mitigation approach can be assigned to a set of generalized mitigation actions that it implements.

Additionally, each mitigation approach is assigned (e.g., by the mitigation component 180) a strength with which it implements the mitigation category. Accordingly, the influence of a particular mitigation on an adversary action can be the product of the maximum influence of a mitigation category on the adversarial action and the strength with which the particular mitigation implements that mitigation category.

For example, an exemplary subset of mitigation actions in a set of mitigation actions include:
 i. cyber tamper detection
 ii. control information access
and the adversary actions include:
 a. acquire insider with cyber access
 b. functional modification
 c. reliability modification d. acquire remote cyber access e. disrupt availability of cyber resources In an embodiment, an assessment may be made that "cyber tamper detection" influences adversary actions 'c' and 'd', and further, an assessment might be made that "control information access" impacts adversary actions a-e. Further expanding the example, a determination is made that, on a scale of [0,1], "cyber tamper detection" can impact "functional modification" by at most 0.6 and reliability modification by at most 0.2. Accordingly, a particular implementation of "cyber tamper detection" may be selected, such as authentication, and a further assessment made that it implements "cyber tamper detection" with a strength of 0.7. Based on the forgoing example, the influence of authentication on functional modifications is 0.7*0.6=0.42 and the influence on reliability modifications is 0.7*0.2=0.14.

The strength measurements can be obtained (e.g., by the mitigation component 180) in a plurality of ways. One technique is to generate those using sets of attributes and assessments of scores for each attribute, per the strength assigning approach. This technique addresses subjectivity by limiting the impact of specific mitigations by the pre-assessed maximum impact of a mitigation type on the adversarial action. Additionally, this enables adversary behaviors to be addressed directly, and since the technique is abstracted away from the supply chain representation, it is conducive to re-use. However, this abstraction also makes it more difficult to assess the cost or time required to implement a mitigation 480, since these are impacted by the location and item to which they are applied.

Both of these exemplary approaches can provide mechanisms for assessing the impact of mitigations on adversarial behavior. Consequently, they can enable defenders to determine which mitigations will have the most desirable impact on their supply chains. If metrics, such as the cost to implement and maintain a mitigation, and time required to deploy a mitigation 480, are utilized in the assessment, then these approaches can also be utilized to support solving constrained optimization problems aimed at determining which specific mitigations $480_{1-n}$ should be deployed, given limited resources, to have the most impact on the supply chain.

Upon application of the one or more techniques for analyzing (e.g., by the mitigation component 180) an impact of a mitigation(s) $480_{1-n}$ on an adversarial behavior(s), a constrained optimizer can be constructed to enable determination of which subset of mitigations in a plurality (or set) of mitigations $480_{1-n}$ should be applied to have maximal impact on the supply chain. Constraints for the optimization can be of any suitable parameter or type, and in an example, non-exhaustive listing can include time, cost, and influence, where influence is a measure of an ability to modify operations or apply mitigations at a particular location or to a particular item within the supply chain. For example, if a mitigation is an option offered by a vendor, then the supply chain defender may select to utilize the offered option, and accordingly, the defender may have high influence in attack mitigation. Alternatively, if a mitigation requires a vendor to change their business practices with no concrete benefit, then a low influence may result.

It is to be noted that since the SCG 142 (and any of the graphs and/or charts 210, 220, 176, 178, based thereon) utilized in the various embodiments presented herein has a finite number of nodes and edges, and the adversary and defender actions are also finite sets, accordingly, the various embodiments presented herein present a supply chain analysis method that may produce a bounded problem space for analysis, but permits any desired level of detail for that analysis. The various embodiments presented herein enable a bounded, formalized, and automatable supply chain representation and the vulnerabilities and mitigations applying thereto, and further, such representation can be extended to whichever level of detail is available or desired. The supply chain representation is amenable to a visualization utilizing <difficulty, consequence> plots, and is further suitable for input to constrained optimizers that can determine the most appropriate set of mitigations 480 to deploy.

5. Risk Ranking

Returning to the risk component 150, as previously mentioned, the various risks $156_{1-n}$ determined for the various nodes $144_{1-n}$ and edges $146_{1-n}$ presented in the SCG 142 can be given a ranking. This can be done without the generation of attack graphs, or data from an attack graph could be used to supplement the basis for such a ranking A plurality of ranking methods can be utilized (e.g., by any of components 150, 160, 170, or 180) to enable aggregation of responses 154 from the questionnaires 152, and further to generate risk scores $156_{1-n}$ for the various nodes $144_{1-n}$ and edges $146_{1-n}$ in the SCG 142, e.g., any of individual entities, process steps, tools, and infrastructural elements, etc. Furthermore, the aggregation of an estimated risk from a questionnaire(s) is not limited to a ranking scheme but can use any appropriate aggregation scheme. The methods can support the hierarchical nature of the SCG 142, and hence can be configured to accommodate questionnaires 152 with differing levels of detail, as well as different types of questionnaires 152. In an embodiment, the differing levels of detail can be accommodated by organizing questions on the questionnaire(s) 152 into various risk indicator categories. By utilizing questionnaires 152 having the same indicator categories, it is possible to average the questions within an indicator category to form an indicator score, and then average the indicator scores to establish an overall risk score. Accordingly, a first question on a first questionnaire pertaining to security at a design house can be assigned the same indicator category as a second question on a second questionnaire pertaining to security at a supplier.

Any suitable indicators can be utilized, wherein such indicators, in a non-exhaustive listing, can include:

i. Control (e.g., over something or someone).

ii. Exposure (e.g., to something or someone).

iii. Diversity (e.g., of something or someone).

iv. Criticality (e.g., importance of something or someone).

v. Visibility (e.g., into something or someone).

vi. Complexity (e.g., of something or someone).

vii. Resiliency (e.g., of something or someone).

To determine the difficulty of an adversary action at a particular location, in an embodiment, a function of the risk scores along the various risk dimensions at that location can be utilized, for example, with reference to the previously mentioned actions of acquire, delay, modify, inject, circumvent:

difficulty of acquire=(control score+(1−exposure score)+(1−diversity score))/3. (a)

difficulty of delay=(control score+diversity score+ resiliency score+(1−complexity score))/4. (b)

difficulty of modify=(control score+diversity score+ visibility score+resiliency score+(1−exposure score)+(1−complexity score))/6. (c)

difficulty of inject=(control score+diversity score+ visibility score+(1−exposure score)+(1−complexity score))/5. (d)

difficulty of circumvent=(control score+(1−complexity score))/2.  (e)

Similar equations can be defined for additional attacker actions. Further, consequences can be estimated based on the impact that an attacker's actions have on any of Confidentiality, Integrity, and Availability parameters. The consequences are a function of (action, object) pairs. The impacts are defined in the following Table 1:

| Rule | Consequences | | |
|---|---|---|---|
| | Confid. (Cc) | Integ. (Ci) | Avail. (Ca) |
| acquire | 1 | 0 | 0.5 |
| acquire_o | 0.5 | 0 | 0 |
| delay | 0 | 0 | 1 |
| delay_o | 0 | 0 | 0.5 |
| counterfeit | 0 | 1 | 0.5 |
| counterfeit_o | 0 | 1 | 0.5 |
| inject | 0 | 0 | 0 |
| inject_o | 0 | 0 | 0 |
| modify_functionality | 0 | 1 | 0.5 |
| modify_functionality_o | 0 | 1 | 0.5 |
| modify_reliability | 0 | 0.5 | 1 |
| modify_reliability_o | 0 | 0.5 | 1 |
| modify_funct&reliability | 0 | 1 | 1 |
| modify_funct&reliability_o | 0 | 1 | 1 |
| circumvent | 0 | 0 | 0 | where _o indicates an object acquired outside of the modeled supply chain, for example, by purchasing it commercially, and no postfix indicates an object within the modeled supply chain. Circumvent does not have an _o rule.

In another embodiment, ranking methods can be utilized to determine a weighting(s) for an average(s), for example, a higher weighting can be applied to the 'diversity' indicator than the 'exposure' indicator to correspond to a requirement that diversity is more important than exposure when the ranking operation is performed. Ranking approaches typically produce a rating for each item, where a rating is a numerical score. Sorting the rating list produces a ranking, which is an ordering for the list. In an embodiment, the ratings produced by the ranking approaches can act as weights for a weighted average. Hence, for each of the indicator categories in a questionnaire 152, an initial process can involve ranking the questions 153 within a category against each other. The ratings produced during this process can then be used as weights to enable establishment of an indicator score by a weighted average of the questions 153 for that indicator. Subsequently, the indicator categories can be ranked against each other, and the resulting ratings can be utilized as weights for a weighted average of the indicator scores. The result of this second average is the overall risk score.

In an embodiment, the different questionnaires 152 can have different questions, but the same indicator categories. Consequently, different weighted averages can exist to establish the indicator scores for different questionnaires 152. During averaging of the indicator scores to establish the overall risk score, the same weights can be utilized for different types of questionnaires 152, and hence, this average can be utilized to combine the results from different questionnaires 152. Hence, different levels of detail can be accommodated in the questions 153, and in particular, it enables support of both high-level "macro" and detailed "micro" data collection in one or more of the analyses presented herein.

5.1. Ranking Methods/Approaches

As mentioned, a plurality of different ranking and/or aggregation methods can be utilized (e.g., by the risk component 150) to rank the various risks in the SCG 142. A brief description of a number of suitable methods are now described, and how they may be applied to the data received in the responses 154 to the questionnaires 152. Ranking approaches are commonly applied to sports. Accordingly, some of the following refers to "teams", "games", "competitions", and "points", however these terms can be translated into the exemplary framework (e.g., based upon SCG 142, the attack graphs 176, the relative risk graph 178, etc.) to establish the desired risk ratings. Example translations appear in the descriptions of the various ranking methods.

5.1.1 Massey's Method

Massey's method is based on estimating the outcome of a competition between two teams. In particular, the approach aims to provide:

$$r_i - r_j = y_k \quad (1)$$

where $y_k$ is the margin of victory for a competition between teams i and j and $r_i$ and $r_j$ are the ratings for teams i and j. In Massey's method the linear system is solved per Eqn. 2

$$Mr = p \quad (2)$$

where $M = X^T X$ is the Massey matrix, r is the ratings vector, and $p = X^T y$. The matrix X has one row for each competition, with $X_{ij} = 1$ indicating a victory of i over j and $X_{ij} = -1$ indicating a victory of j over i. If there are n teams, then M will be an n×n matrix with diagonal elements $M_{ii}$ equal to the number of games that team i played and $M_{ij}$ equal to −1*(number of competitions between teams i and j). The vector p consists of cumulative point differentials. For each competition in which a team k is involved, $p_k$ can be incremented per Eqn. 3:

$$score_k - score_j \quad (3)$$

where j was the opposing team. Now, the rows of M sum to 0, so its columns are linearly independent and (1) does not have a unique solution. This can be corrected by replacing the last row of M with a row of 1s, and replacing the last element of p with 0.

Massey's method naturally incorporates ties. To create a "no-ties" Massey method, simply exclude from the analysis any competition resulting in a tie by updating the appropriate entries in M.

To apply Massey's method to the various embodiments presented herein, particularly the problem of ranking risk(s), the terms "competitions" and "teams" are to be redefined. One option is to treat each question in each questionnaire 152 as a team, and to make pairwise comparisons amongst the different questions, where each question's score is the same in each of its competitions and is simply the value in [0,1] that was assigned to it when the questionnaire's responses 154 were scored.

5.1.2. Colley's Method

Colley's method rates teams based on their winning percentage. It does not include any "point" information from individual competitions. This removes potential problems caused when a strong team scores many points against a weak team. Colley's method is based upon the following Eqn 4:

$$Cr = b \quad (4)$$

where r is the desired ratings vector. If $w_i$ is the number of wins for team i, $l_i$ the number of losses, and $t_i$ the number of games for team i, then the following definition can be obtained, $b_i=1+\frac{1}{2}(w_i-l_i)$. Cij is further defined, per Eqn. 5:

$$Cij = \begin{cases} 2+t_i, & i=j \\ -n_{ij}, & i \neq j \end{cases} \quad (5)$$

where $n_{ij}$ is the number of times teams i and j played each other.

To incorporate ties into the Colley method the matrix C has to be modified. If teams i and j tie then $C_{ii}$ and $C_{jj}$ are incremented by 1, and $C_{ij}$ and $C_{ji}$ are decremented by 1. To use Colley's method, competitions can be defined in the same manner as per the previously described approach for Massey's method.

5.1.3. Colleyized Massey Method

The Colleyized Massey method is presented in Eqn. 6:

$$Cr=p \quad (6)$$

with C, r, and p the same as previously defined. Since this approach uses matrix C it does not incorporate ties. Including ties in the analysis requires updating C with the approach described in Sec. 1.2, above.

5.1.4. Masseyized Colley Method

The Masseyized Colley method is presented in Eqn. 7:

$$Mr=b \quad (7)$$

with M, r, and b defined as before. Since this approach uses the matrix M it naturally incorporates ties. To eliminate ties from the analysis, M can be modified to exclude tied competitions.

5.1.5. Keener's Method

Keener's method relates the rating for a team to the absolute strength of that team, which is dependent on the strength of the team relative to the teams that it has competed against. Teams are then ranked according to their overall strength. For this approach, an initial method of comparing the relative strength of teams is required, where, per eqn. 8:

$a_{ij}$=value of the strength measure when comparing team $i$ to team $j$ \quad (8)

for instance, $a_{ij}$ may be based upon the number of times team i has defeated team j, while treating a tie as one half of a win:

$$a_{ij}=w_{ij}+t_{ij}/2 \quad (9)$$

where the $w_{ij}$ are wins and the $t_{ij}$ are ties. Other options for the parameter $a_{ij}$ are available. For example, $a_{ij}$ can be set to be equal to the number of points that team i scored against team j. Typically, rather than directly using the strength measure, as in $a_{ij}=s_{ij}$, it may be preferential to set $a_{ij}$ per Eqn. 10:

$$a_{ij} = \frac{s_{ij}+1}{s_{ij}+s_{ji}+2} \quad (10)$$

A skewing function can also be applied by replacing $a_{ij}$ with $h(a_{ij})$ where, per Eqn. 11:

$$h(x) = \frac{1}{2} + \frac{\text{sgn}\{x-(1/2)\}\sqrt{|2x-1|}}{2} \quad (11)$$

To determine the rating vector r, Ar in Eqn. 12 can be solved:

$$Ar=\lambda r \quad (12)$$

meaning that the ratings vector is the eigenvector associated with $\lambda$. To determine which eigenvector to use for r the solution can be subject to several constraints:
1. A must be non-negative: $|a_{ij}|>0 \forall i,j$
2. A must be irreducible
3. A must be primitive: $\exists p$ s.t. $A^P>0$ The formulations of the ranking problem naturally satisfies these constraints as long as non-negative strength measure is chosen. The irreducibility and primitively constraints will be met since as the same number of competitions exist amongst all competitors. If the last two constraints are not met for some reason, they can be forced by adding a small $\varepsilon$ to each element of A.

With these constraints, the largest, real-valued eigenvalue for $\lambda$ and the associated eigenvector, r, are chosen which will satisfy r>0 and $$\sum_{j=1}^{n} r_j = 1.$$

Often, the Keener method accounts for ties due to the selection of the strength measure.

5.1.6. Elo's method

Elo's method assumes that each competitor's performance is a random variable who's mean, $\mu$, can change slowly over time. These adjustments are made by setting the competitor's new rating, $r_{new}$, as a function of the previous rating, $r_{old}$, the competitor's recent performance value S, and a constant, K, per Eqn. 13:

$$r(\text{new})=r(\text{old})+K(S-\mu) \quad (13)$$

The mean is set by a logistic function, per Eqn. 14:

$$\mu_{ij} = \frac{1}{1+10^{-d_{ij}/\varphi}} \quad (14)$$

where $d_{ij}=r_i(\text{old})-r_j(\text{old})$ and $\varphi$ is a parameter that controls the expected probability of team i defeating team j as a function of their difference in ratings.

There are numerous ways to define the performance measure, S. One option is to set $S_{ij}$, per Eqn. 15:

$$S_{ij} = \begin{cases} 1, & i \text{ defeated } j \\ 0, & j \text{ defeated } i \\ 1/2, & i \text{ and } j \text{ tied} \end{cases} \quad (15)$$

another option is to incorporate scores by allowing $P_{ij}$ to be the number of points that i scored against j and setting Sij per Eqn. 16:

$$S_{ij} = \frac{P_{ij}+1}{P_{ij}+P_{ji}+2} \quad (16)$$

The initial ratings for all competitors should be the same, and can be set to 0.

5.1.7. Markov's Method

Markov's method involves establishing methods for the two competitors to cast votes for one another. For example, the losing team might cast one vote for the winning team, or the losing team may cast a number of votes equal to the margin of victory for the winning team, or each team may cast as many votes for the other team as that team scored in the competition. Any number of voting matrices $V_{stat}$ can be used. Each of the $V_{stat}$ can be transformed by normalizing their rows to form a set of matrices $S_{stat}$. Next, the matrix S can be formed as a weighted sum of the $S_{stat}$, and, to ensure a unique rating vector r, $\overline{S}$ is calculated per Eqn. 17:

$$\overline{S} = \beta S + \frac{1-\beta}{nE}, 0 < \beta < 1 \qquad (17)$$

for the matrix of all ones E and where there are n teams. The rating vector r is then the eigenvector associated with the dominant eigenvalue of the eigensystem $\overline{S}r=r$.

Depending on the type of voting used to form the $V_{stat}$, ties may or may not be incorporated in the Markov method. Consequently, incorporating (or removing) ties will be dependent on the form of the $V_{stat}$.

5.1.8. Offense-Defense Method

The offense-defense method assigns each team both an offensive rating and a defensive rating, where the offensive rating is a function of how many points the team scores against its opponents (and in particular, against good defensive opponents), while its defensive rating is related to how few points the team permits its opponents (and in particular, its good offensive opponents) to score.

For the offense-defense method a matrix A is established where:

$$a_{ij}=\text{the number of points team } j \text{ scored against team } i \qquad (18)$$

If teams i and j did not compete, then set $a_{ij}=0$, and if they competed more than once, use the average of the results.

Defining some notation, given a column vector $x=[x_1 \, x_2 \ldots x_m]^T$ then $x^+=[1/x_1 \, 1/x_2 \ldots 1/x_m]^T$ is defined. Now, letting o be an offensive rating vector and d be a defensive rating vector, two iterations are defined per Eqns 19 and 20:

$$o_k=A^T(Ao_{k-1}^+), \text{for } k=1,2,3 \qquad (19)$$

$$d_k=A(A^T d_{k-1}^+), \text{for } k=1,2,3 \qquad (20)$$

where the iterations converge to the offensive or defensive rating, respectively, and $o_0=d_0=e$, the vector of ones. Rather than computing both iterations, it is possible to compute only one and then use, per Eqns. 21 and 22:

$$o=A^T d^+ \qquad (21)$$

or $$d=Ao^+ \qquad (22)$$

to find the other. The overall rating vectors are defined as $r_i=o_i/d_i$ for each team i.

The offense-defense method naturally incorporates ties. To remove them, set the scores from tied games to 0.

5.2. Aggregation Methods

The implementation approaches discussed in section 5.1 may require that rating lists are aggregated in order to obtain weights for a weighted average, or in order to obtain risk scores. To accommodate this, the following presents example methods for aggregating the intermediate rating lists produced by the ranking methods.

For this, initially rating matrices are formed from the ratings lists by creating one rating distance matrix D for each rating list, where $$D_{ij} = \begin{cases} r_i - r_j, & r_i > r_j \\ 0, & \text{otherwise} \end{cases} \text{ for}$$

ratings $r_i$ and $r_j$. The different ranking approaches will produce rating distance matrices at different scales. To accommodate this, each matrix can be normalized by dividing each element of matrix D by the sum of all elements in D to produce the normalized matrix $\overline{D}$. Given a collection of these rating distance matrices, the rating distance matrices can be aggregated with an element-wise average to produce average matrix $\overline{D}_{avg}$.

There are several methods for establishing rating vectors from matrix $\overline{D}_{avg}$, and they are described below.

5.2.1. Method 1

The offensive rating vector can be defined as the row sum $o=\overline{D}_{avg}e$ and the defensive rating vector as the column sum $d=e^T\overline{D}_{avg}$. The overall rating vector can then be computed as $r=o/d$.

5.2.2. Method 2

$\overline{D}_{avg}^T$ can now be normalized, and then the Markov ranking method can be applied.

5.2.3. Method 3

A small scalar ε can be added to each element of $\overline{D}_{avg}$ and then the eigenvector corresponding to the dominant eigenvalue of the resulting matrix can be found, wherein the found eigenvector can be utilized as the rating vector.

5.3. Implementation

The questionnaire 152 can be configured to comprise several columns for representing suppliers, tools, infrastructure, and the process owner. Within each column, questions 153 can be arranged by indicators. For implementation of the ranking and risk score, the columns can be stacked on top of one another to produce one dimensional data for the ranking approaches.

Figure 5:
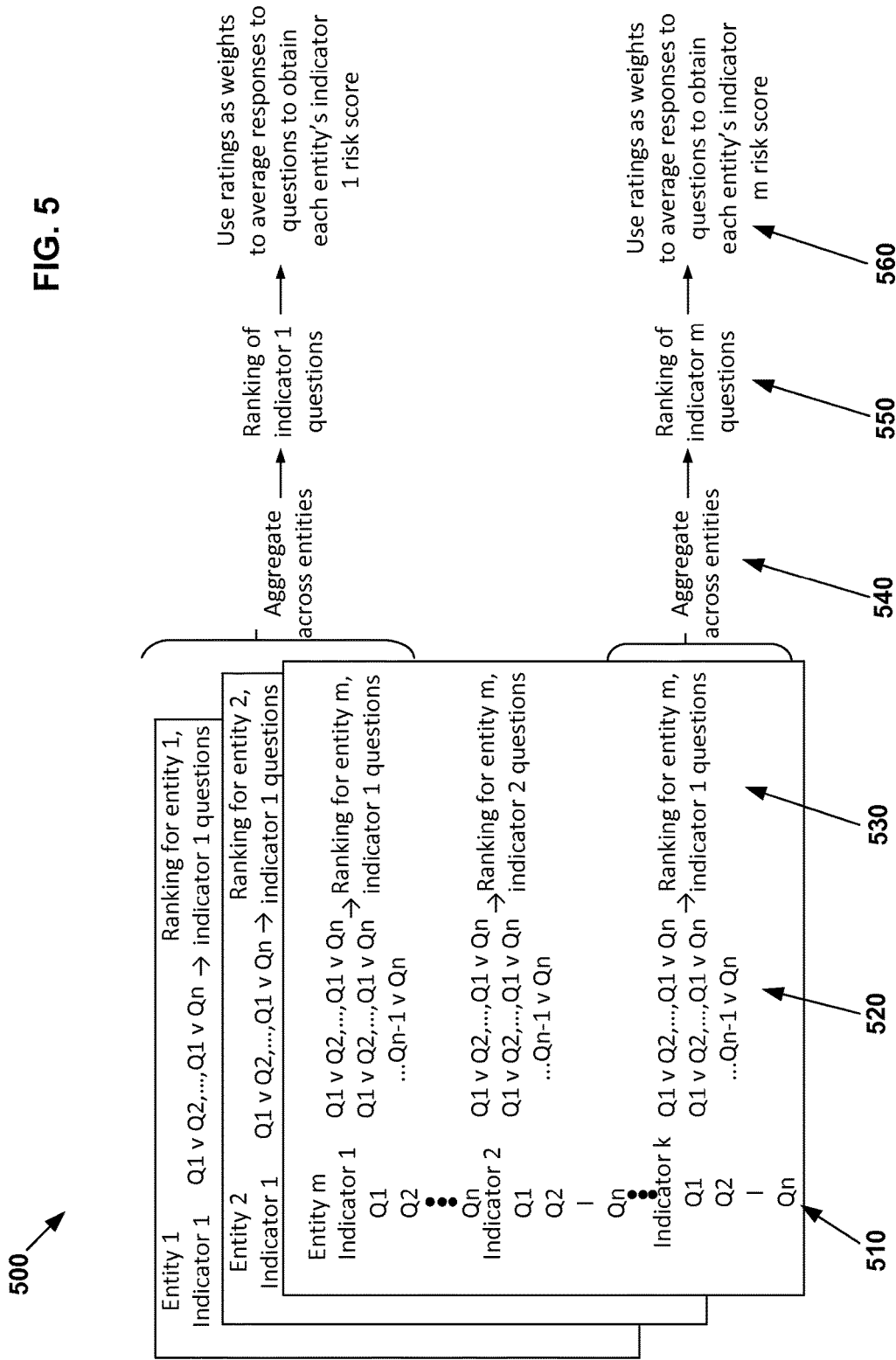
FIG. 5 is a schematic representation of a method for ranking risk based upon answers to questionnaires, according to an embodiment.

A good concept is required of what constitutes a "competition" between "teams". Treating each question 153 as a different team can satisfy this requirement. Competition between questions $153_{1-n}$ (e.g., on one or more questionnaires 152) can be established. Turning to FIG. 5, process 500, wherein ranking aggregates questions for each indicator, one approach is to assign (e.g., at 510) each question $153_{1-n}$ a number of points based on the risk score that has been assigned to each respective question $153_{1-n}$. At 510, for each entity, pairwise competitions can be established between the questions $153_{1-n}$ by comparing their scores. This has an advantage of creating a single competition amongst each pair of questions, but it also has a disadvantage of assigning each individual question the same score for each of its competitions. For each entity, this approach can result in one ranking (e.g., at 530) of the questions for each indicator. Then, on an indicator by indicator basis, these rankings can be aggregated (e.g., at 540) across entities to find an overall ranking of the questions for each indicator (e.g., at 550).

In this approach (e.g., at 560), the ratings can be utilized as weights for a weighted average of the questions 153 belonging to one indicator to estimate a risk score for that indicator. If the resulting ratings are utilized as weights for a weighted average, then the weights will change each time the framework is applied to a new supply chain (e.g., a subsequent SCG 142 representation) and, further, as new entities are added to the supply chain. The process 500 does not consider SME evaluations of the importance of the questions to determining overall risk, but rather assigns more weight to the questions that are scored as having the most risky responses.

Figure 6:
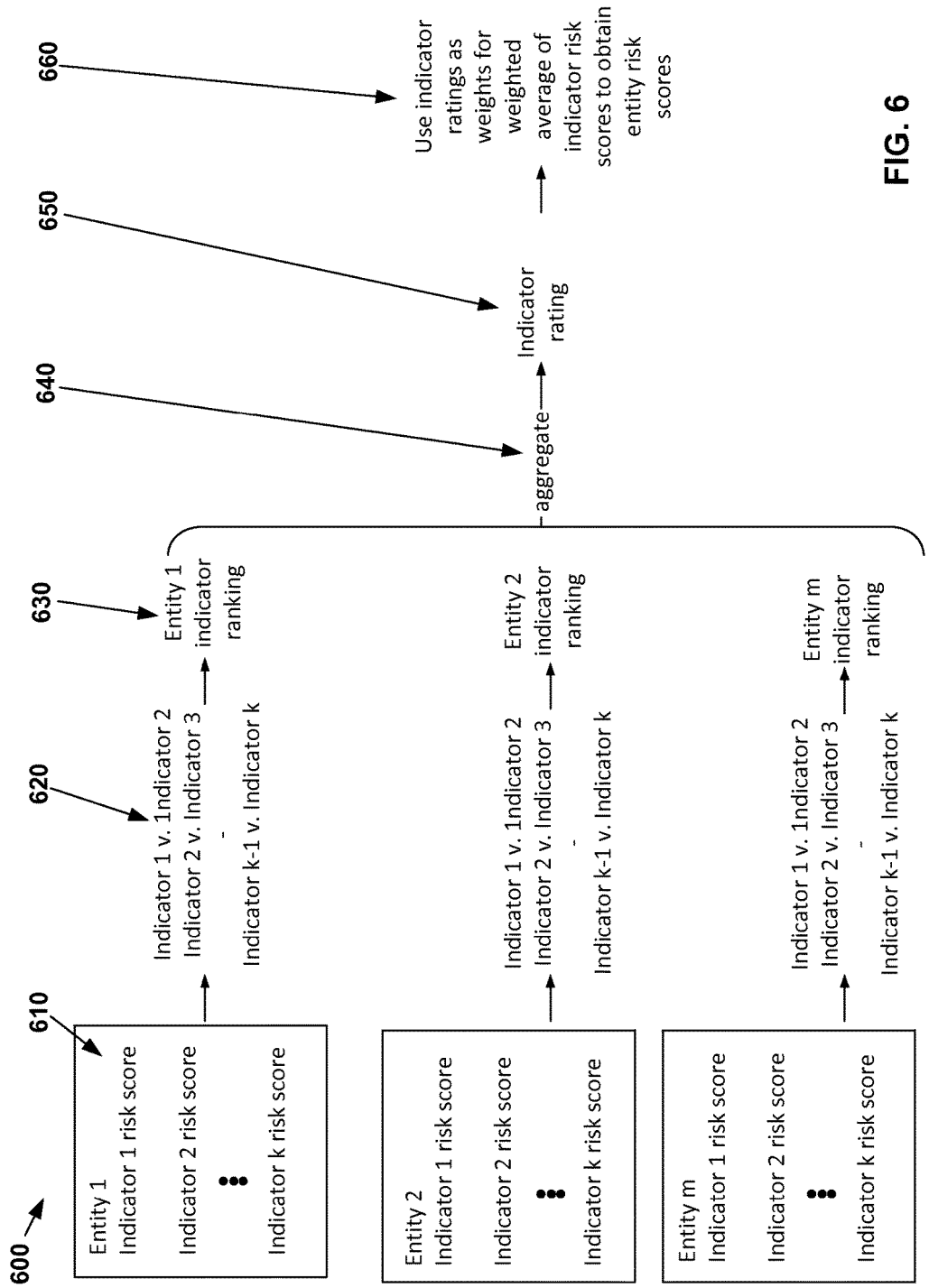
FIG. 6 is a schematic representation of a method for ranking risk through utilization of questionnaires, according to an embodiment.

FIG. 6, process 600, illustrates a further approach wherein risk scores are found for individual entities by forming comparisons between the indicators for each ranking, aggregating these to find an overall rating of the indicators, and then using the resultant ratings as weights for a weighted average of the indicator risk scores. The resulting indicator risk scores (e.g., at 610) can be utilized to rank the indicators against each other by forming pairwise competitions between the indicators for an individual entity (e.g., at 620). For each entity, this will result in one ranking of the indicators (e.g., at 630). Subsequently, these indicator rankings can be aggregated (e.g., at 640) across the entities to find an overall indicator ranking, and use the corresponding ratings as weights for a weighted average of the indicator risk scores (e.g., at 650). The result is an overall risk score for each entity.

Figure 7:
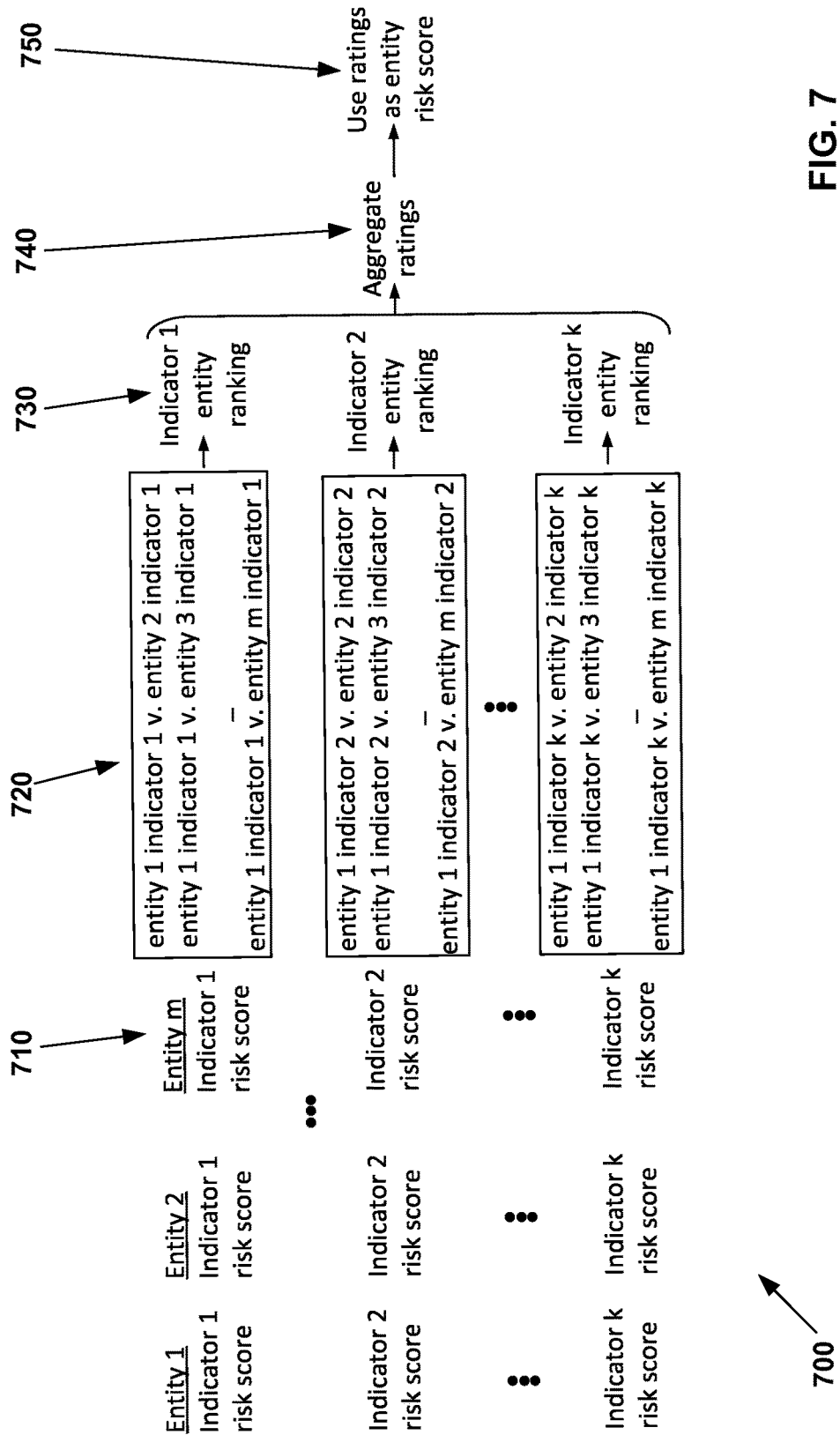
FIG. 7 is a schematic representation of a method for ranking risk, according to an embodiment.

FIG. 7, process 700, illustrates finding risk scores for individual entities by forming comparisons between the entities for each indicator. Entities can be ranked (e.g., at 710) against each other on an indicator by indicator basis. In this approach, each indicator can be treated (e.g., at 720) as one of several competitions between the entities. The result will be a ranking vector (e.g., at 730) for the entities. The ratings from the individual indicators can be aggregated (e.g., at 740) to find an overall rating for the entities. The resulting ratings can be used (e.g., at 750) as the overall risk scores for the entities.

To accommodate data at different levels of fidelity, such as high-level "macro" and detailed "micro" questions, the question-level aggregation can be performed amongst entities with questions asked at the same level of detail. Since this results in indicator-level scores, indicator-level ranking and aggregation can occur across all entities, regardless of the detail of the questions asked of the entities.

Figure 8:
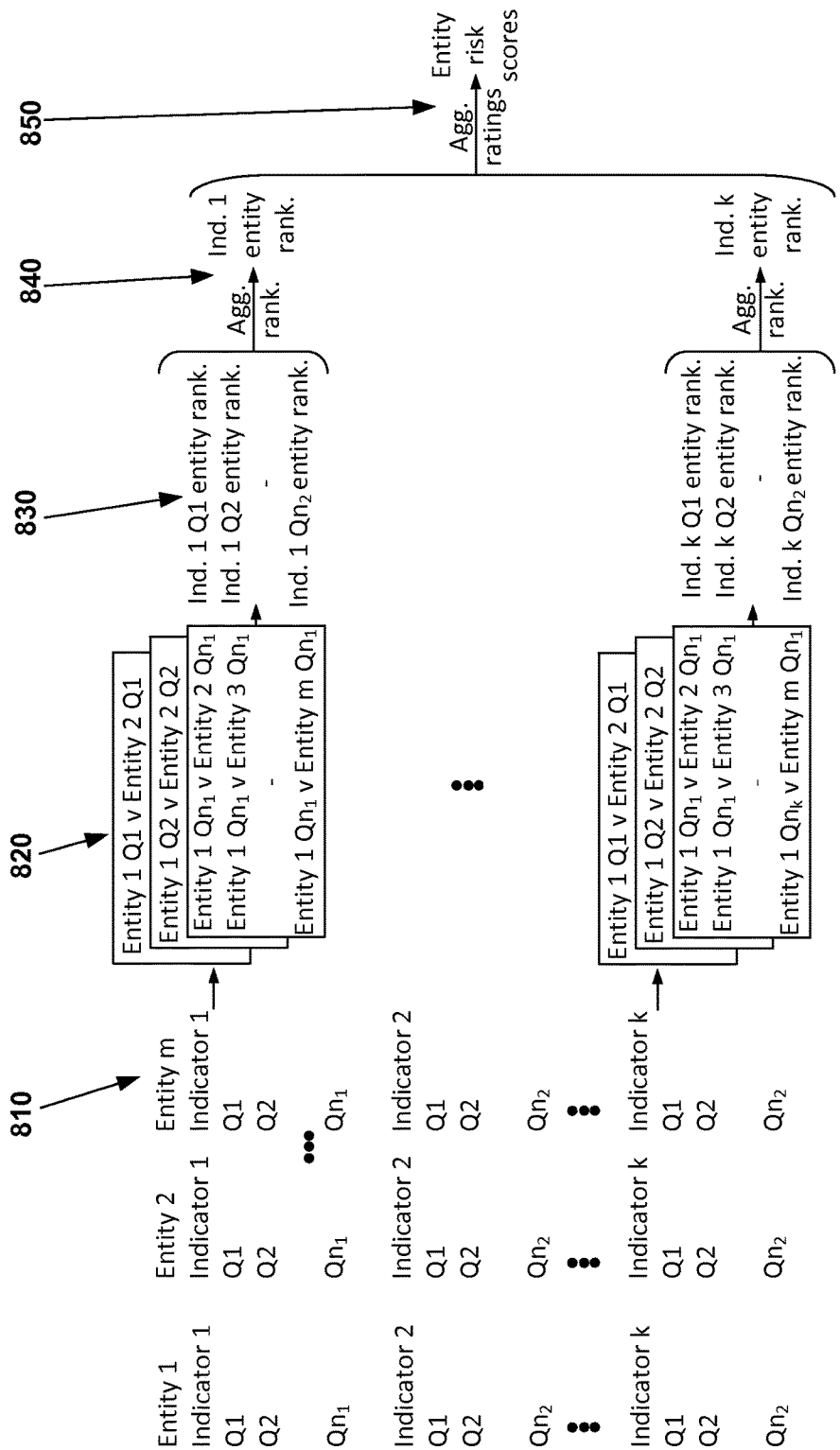
FIG. 8 is a schematic representation of a method for ranking risk, according to an embodiment.

FIG. 8, process 800, illustrates an approach comparing entities on the basis of individual questions. Competitions can also be formed (e.g., at 810) amongst entities for each question. In this approach, the score from each question is compared (e.g., at 820) to the score from the same question for each other entity. This will result in a ranking (e.g., at 830) of the risk of each entity on the basis of a single question. After completing this process for each question in a particular indicator category the rankings for each indicator can be aggregated (e.g., at 840), providing a ranking of the entity's risk with respect to a single indicator. These can then be aggregated (e.g., at 850) using the corresponding ratings as the entity's risk scores. Aggregation of the rankings produces an entity ranking for each indicator. The indicator rankings can then be aggregated to find the overall entity ranking and utilize the corresponding ratings as the entity's risk score. To accommodate data at different levels of fidelity it is possible to use the ratings from the indicator level ranking as the entities' indicator risk scores. Competitions can then be formed between entities at the indicator level, and these can be aggregated to find an overall entity rating. This is the same approach as utilized with the aggregation method shown in FIG. 7. The foregoing presents various methods, etc., to facilitate ranking by the risk component 150.

As mentioned, an aggregation of the questionnaire responses 154 can also be performed without generating attack graphs and without the use of ranking. In an exemplary embodiment, each response from a question $153_{1-n}$ can be assigned both a value and a weight. In this example, the value is based on the risk associated with the response, e.g. −1 for low risk, 0 for average and 1 for high risk, and the weight is based on the confidence with which the question was answered, e.g. 0 for no confidence or no response and 1 for high confidence. With these example definitions, the responses can then be aggregated by one of the previously mentioned approaches. For example, first aggregating all the responses for each particular entity, artifact or process step, then aggregating all the responses for each particular indicator, and so on until an overall value and weight are reached. The overall risk value and weight describe the overall risk (e.g., low, average or high) and the amount of information (e.g., represented as a fractional number of questions answered with high confidence in this case) upon which the overall risk score is based. After doing such an aggregation, a tree of values and weights can be visualized to aid in explaining an overall or intermediate risk value.

Further, risk scores generated in any of the manner set forth above can be assigned to a color scale. For instance, for ratings ranging from 0 (no risk) to 1 (highest possible risk), green can be assigned to 0, red can be assigned to 1, and a smooth gradient can be used to represent values between 0 and 1. Accordingly, nodes and edges in the SCG can be colored to provide a visual depiction of risk. Other representations of the supply chain can also be colored; for instance, artifacts, objects, information, material, entities, suppliers, process steps, etc. can be represented in a matrix, and a cell associated with any particular element can be colored according to a risk score.

It is to be appreciated that while the various embodiments presented herein are directed towards supply chain analysis, the embodiments are applicable to any suitable technology, wherein with or without modification to such parameters as system representation, adversary action(s), defender action(s), potential mitigation(s), etc., the various embodiments can be applied to any system or technology requiring security assessment, and the one or more attacks that can be conducted against the system or technology.

Figure 9:
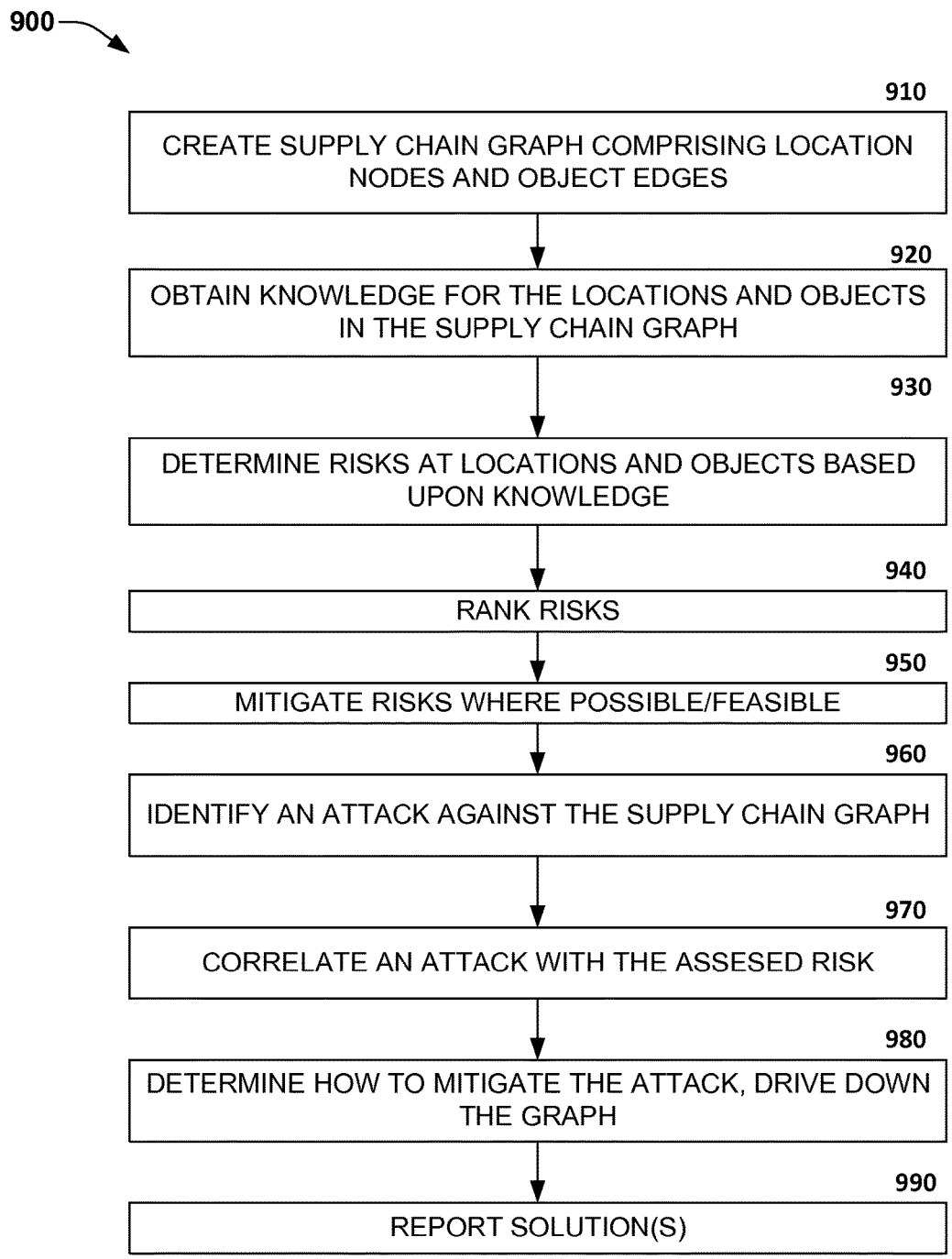
FIG. 9 is a flow diagram illustrating an exemplary methodology for identifying and mitigating attacks on a supply chain.

FIG. 9 illustrates an exemplary methodology relating to identifying and mitigating risks and attacks on a supply chain. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement the methodology described herein.

At 910, a computer-implemented representation of a supply chain can be generated, wherein the representation comprises nodes (e.g., locations) and edges (objects, activities, information, etc.), as previously described. The supply chain representation can be generated by a supply chain analyzer system (SCAS).

At 920, a plurality of questionnaires can be generated and forwarded to various entities having knowledge of information pertaining to the nodes and/or edges. Such entities can be a subject matter expert having knowledge of machines located at a factory and the capabilities thereof. Completed questionnaires can be received at the (SCAS), and data extracted therefrom. As previously mentioned, to facilitate ranking of the various risks across the various nodes and edges, questions can be categorized, wherein questions in the same category can be given a common indicator. Hence, while a first question on a first questionnaire can be directed to a first location (e.g., first node) regarding an ability to acquire an item from the first location, the first question can be given the same category indicator as a second question on a second questionnaire directed to a second location (e.g., a third node) regarding an ability to acquire an item from the second location.

At 930, based upon the responses in the questionnaire (in conjunction with previously known information) a plurality of risks can be identified for one or more of the nodes and/or edges in the supply chain representation.

At 940, the plurality of risks can be ranked, wherein ranking can be by any suitable method or technology. By ranking the risks, it is possible to readily identify which risks need to be addressed, while attention to others can be postponed, if any attention is required. As previously described, the ranking also enables determination of where the supply chain is most susceptible to attack.

At 950, an initial mitigation operation can be conducted based upon the ranked risks. For example, if a highly ranked risk can be easily reduced (e.g., effectively in terms of cost, time, etc.), then it can be flagged to be mitigated.

At 960, one or more attacks can be automatically generated against the various nodes and/or edges in the supply chain representation. The attacks can be generated based upon a template(s) or a rule(s), wherein such template and/or rules can control attack generation and location. For example, an attack can be generated that a certain item (e.g., bill of materials) is to be acquired. Accordingly, by utilizing the template and/or rule based attack, the attack can only be directed towards those nodes and/or edges where a bill of materials exists and/or is accessible. Hence, for those nodes and/or edges where it is not possible to obtain, for example, a bill of materials, these nodes and/or edges can automatically be removed from a list of nodes and/or edges at which the attack(s) can occur. Further, while an attack may initiate at a particular node and/or edge, a portion of the attack may be directed towards another node and/or edge. For example, an item is to be acquired at an edge in the supply chain, modified, and then injected back into the supply chain at a node in the supply chain. In an embodiment, an attack path can be generated between any edge(s) at which the item can be acquired and any node(s) at which the modified item can be injected back into the supply chain. In an embodiment, a suitable edge and node may be adjacently located in the supply chain. In another embodiment, a suitable edge and a suitable node may be at separate positions in the supply chain, and accordingly an attack path can be automatically identified between them. However, in another embodiment, while the suitable edge and the suitable node may be at separate, but seemingly connectable positions in the supply chain, the edge may be located in a first continent and the node is located on a different continent, and it may not be possible to transport the acquired item from the edge to the node without being detected. Accordingly, for the latter example, an attack rule can be established that prevents this attack from occurring, and thus, the attack path is not considered in the one or more attacks that can occur on the supply chain. The various attacks can be automatically generated based upon a context-free grammar, wherein a requirement(s) in the attack is either satisfied or it isn't.

At 970, the various attacks can be automatically correlated with the risks to determine which nodes and/or edges are likely to be attacked. In an embodiment, each attack and risk can be combined to form a <difficulty, consequence> pair, wherein the respective values can be automatically plotted on a relative risk chart, as previously described. The relative risk chart enables visualization of which attacks have a low level of difficulty and a high consequence if successful, and further which attacks have a high level of difficulty (e.g., may be prohibitively complex) and/or may have a limited consequence, if any, from a successful attack.

At 980, one or more mitigations can be automatically generated to address the attacks. In an embodiment, the mitigations can be constrained such that only those mitigations are performed that are within the constraint (e.g., within a defined cost, within a defined duration, etc.), any mitigations that do not satisfy the constraint are not presented for further consideration. Accordingly, any pertinent information regarding the one or more mitigations can be presented in conjunction with the one or more mitigations (e.g., cost, time, effect, etc.). As previously described, a mitigation is designed to increase the complexity involved in an attack being initiated/conducted (e.g., render the attack prohibitively expensive, increase security, etc.) while reducing a consequence of the attack (e.g., split an item up into a plurality of parts such that if one part is captured, the part is useless without the other, uncaptured, parts). A visualization can be presented indicating the effect(s) of a mitigation (and accordingly, its success) against a particular attack. The degree of success can be weighed against the cost, time, etc., to implement the mitigation. As part of the mitigation process, an outcome of a mitigation can be rendered on the relative risk chart, and further, any effect of the previous rankings of the nodes and/or edges can be re-established based upon the effect of the mitigation on the rankings At 990, a report can be automatically generated (e.g., on a screen, printed out, etc.) and can present a plurality of information as previously described. The report can include any of the computer-implemented supply chain representation, any nodes and/or edges pertaining thereto, any information regarding the nodes and/or edges (e.g., rankings, weightings, etc.), one or more attacks, how the attacks were generated (e.g., context-free grammar statement, template(s), rule(s), etc.), one or more mitigations, mitigation cost, time to implement the mitigation, effect of the mitigation, a (difficulty, consequence) pair(s) and the respective difficulty and consequence values, etc. In an embodiment, the initial supply chain representation can be updated to reflect the effect(s) of a mitigation, an attack, an identified attack path, an entry node, and exit node, etc.

Figure 10:
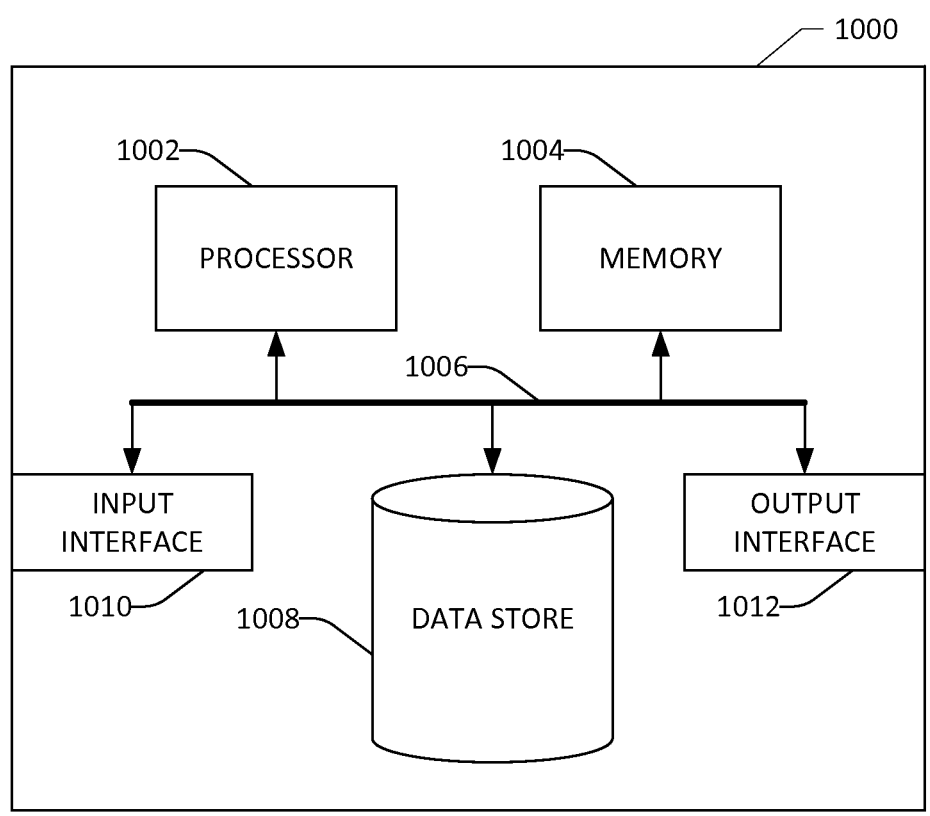
FIG. 10 illustrates an exemplary computing device.

Referring now to FIG. 10, a high-level illustration of an exemplary computing device 1000 that can be used in accordance with the systems and methodologies disclosed herein is illustrated. For example, the computing device 1000 functions as the supply chain analyzer 110, etc. The computing device 1000 includes at least one processor 1002 that executes instructions that are stored in a memory 1004. The instructions may be, for instance, instructions for implementing functionality described as being carried out by one or more components discussed above or instructions for implementing one or more of the methods described above. The processor 1002 may access the memory 1004 by way of a system bus 1006. In addition to storing executable instructions, the memory 1004 may also store operating parameters, required operating parameters, and so forth.

The computing device 1000 additionally includes a data store 1008 that is accessible by the processor 1002 by way of the system bus 1006. The data store 1008 may include executable instructions, operating parameters, required operating parameters, etc. The computing device 1000 also includes an input interface 1010 that allows external devices to communicate with the computing device 1000. For instance, the input interface 1010 may be used to receive instructions from an external computer device, from a user, etc. The computing device 1000 also includes an output interface 1012 that interfaces the computing device 1000 with one or more external devices. For example, the computing device 1000 may display text, images, etc., by way of the output interface 1012.

Additionally, while illustrated as a single system, it is to be understood that the computing device 1000 may be a distributed system. Thus, for instance, several devices may be in communication by way of a network connection and may collectively perform tasks described as being performed by the computing device 1000.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

What has been described above includes examples of one or more embodiments. It is, of course, not possible to describe every conceivable modification and alteration of the above structures or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method, comprising:
   generating a supply chain graph, the supply chain graph comprising a directed graph representation of a supply chain, wherein the supply chain graph comprises nodes that represent physical or logical locations in the supply chain and edges that represent objects and/or information that are stored and/or transmitted between locations in the supply chain;
   generating a first attack graph for the supply chain graph, the first attack graph representative of a sequence of attacks potentially performed at nodes of the supply chain graph, the first attack graph comprising data indicative of a first node of the supply chain graph at which the sequence of attacks can be initiated, the first node representative of a first physical or logical location in the supply chain;
   assigning a difficulty-consequence pair to the first node of the supply chain graph based upon the first attack graph, a difficulty value in the difficulty-consequence pair being based upon a determination of a degree of difficulty to perform an attack at the first node, and a consequence value in the difficulty-consequence pair being based upon a determination of an outcome of the attack occurring at the first node;
   generating a mitigation to the attack;
   determining an ability of the mitigation to at least one of increase a level of difficulty for the attack to occur at the first node or reduce the consequence of the attack occurring at the first node;
   in the event of determining that the mitigation increases the level of difficulty or reduces the consequence of the attack, outputting an indication that the mitigation is applicable at the first node;
   responsive to determining the ability of the mitigation to at least one of increase a level of difficulty for the attack to occur or reduce the consequence of the attack occurring, updating the supply chain graph based on the mitigation; and
   generating a second attack graph for the updated supply chain graph, the second attack graph representative of a sequence of attacks potentially performed at nodes of the supply chain graph subsequent to the mitigation being applied to the supply chain.

2. The method of claim 1, wherein generating the mitigation to the attack comprises applying a constraint to the mitigation, wherein the constraint comprises at least one of a cost constraint defining a maximum cost for the mitigation or a time constraint defining a maximum duration within which to initiate the mitigation.

3. The method of claim 1, wherein a quantified risk of attack is determined based upon a susceptibility to attack at the node and the attack.

4. The method of claim 1, further comprising:
   identifying a plurality of attack actions, wherein the plurality of attack actions can be utilized in one or more attacks;
   applying a context-free grammar to the plurality of attack actions to generate a subset of attack actions; and
   constructing the first attack graph based upon the subset of attack actions.

5. The method of claim 4, further comprising:
   determining a possibility of the attack occurring at the first node based in part that the first node satisfies at least one requirement of the attack as defined by the subset of attack actions.

6. The method of claim 4, wherein the plurality of attack actions comprise acquire an object, modify an object, delay an object, inject an object into the supply chain, circumvent at least one portion of the supply chain.

7. The method of claim 1, further comprising at least one of ranking or aggregating the risk of nodes in the supply chain graph based upon risk scores associated therewith.

8. The method of claim 1, the method further comprising determining at the first node that a requirement pertaining to an object or information utilized at the first location has been satisfied.

9. The method of claim 1, further comprising:
determining a first risk at the first location represented by the first node, wherein the first risk identifies a susceptibility of the first location to attack;
determining a second risk at a second location represented by a second node, wherein the second risk identifies a susceptibility of the second location to attack;
comparing a value of the first risk with a value of the second risk; and
based upon the comparison, ranking the first node relative to the second node.

10. The method of claim 1, further comprising:
identifying a second node in the supply chain graph included in the attack; and
indicating in the supply chain graph, an attack path connecting the first node and the second node.

11. A system comprising:
a processor; and
memory, wherein the memory comprises instructions that, when executed by the processor, cause the processor to perform acts comprising:
generating a directed graph representation of a supply chain, wherein the directed graph representation of the supply chain represents features in the supply chain, wherein the directed graph representation of the supply chain comprises nodes representing physical and/or logical locations in the supply chain and edges representing objects and/or information that are stored and/or transmitted between locations in the supply chain;
generating a first attack graph for the directed graph representation of the supply chain, the first attack graph representative of a sequence of attacks potentially performed against features of the supply chain, the first attack graph comprising data indicative of a first feature of the directed graph representation of the supply chain at which the sequence of attacks can be initiated, the first feature of the directed graph representative of a first feature in the supply chain;
determining a difficulty-consequence pair for the first feature based upon the directed graph representation of the supply chain and the first attack graph, wherein the difficulty-consequence pair comprises a difficulty that is based on a level of difficulty for a first attack in the sequence of attacks to occur at the first feature, and the consequence is based on an outcome of the first attack occurring at the first feature;
determining a mitigation to the attack at the first feature based upon the directed graph representation of the supply chain and the attack graph, wherein the mitigation is based upon an ability of the mitigation to at least one of increase the level of difficulty for the first attack to occur at the first feature or reduce the consequence of the first attack occurring at the first feature;
outputting an indication as to effectiveness of the mitigation to the first attack;
updating the directed graph representation of the supply chain based upon the mitigation; and
generating a second attack graph for the directed graph representation of the supply chain, the second attack graph representative of a sequence of attacks potentially performed at nodes of the directed graph representation of the supply chain subsequent to the mitigation being applied to the supply chain.

12. The system of claim 11, the acts further comprising applying a constraint to the mitigation, wherein the constraint comprises at least one of a cost constraint defining a maximum cost for the mitigation or a time constraint defining a maximum duration within which to apply the mitigation.

13. The system of claim 11, the acts further comprising:
identifying a plurality of attack actions, wherein the plurality of attack actions can be utilized in one or more attacks;
applying a context-free grammar to the plurality of attack actions to generate a subset of attack actions; and
generating the first attack graph and the second attack graph based upon the subset of attack actions.

14. The system of claim 13, wherein the plurality of attack actions comprise acquire an object, modify an object, delay an object, inject an object into the supply chain, and circumvent at least one portion of the supply chain.

15. The system of claim 11, wherein the first feature is represented by a validation node and the acts further comprising determining at the validation node that a requirement pertaining to an object or information utilized at the first feature has been satisfied.

16. The system of claim 11, the acts further comprising:
determining a second risk at a second feature represented in the directed graph representation of the supply chain, wherein the second risk identifies a susceptibility of the second feature to attack;
comparing a value of the first risk with a value of the second risk; and
based upon the comparison, ranking the first feature relative to the second feature.

17. A computer-readable storage medium comprising instructions that, when executed by a processor, cause the processor to perform acts comprising:
receiving a computer-implemented directed graph representation of a supply chain, wherein the directed graph representation comprises a representation of a plurality of features in the supply chain, the directed graph representation comprising nodes that represent physical and/or logical locations in the supply chain and edges that represent objects and/or information stored at or transmitted between locations of the supply chain;
identifying a plurality of potential attack actions, wherein one or more attack actions in the plurality of attack actions combine to form at least one attack on the supply chain;
applying a context-free grammar to the plurality of attack actions to generate a first attack graph representative of a first potential attack on features in the supply chain, wherein the first attack graph comprises a subset of the attack actions in the plurality of attack actions, wherein further the first attack graph comprises data indicative of a first feature of the directed graph representation of the supply chain at which the first potential attack can be initiated;
applying the first potential attack to the directed graph representation of the supply chain based upon the first attack graph; and
outputting a value that is indicative of a consequence of the first potential attack occurring at features of the supply chain based upon the first potential attack being applied to the directed graph representation of the supply chain;

updating the directed graph representation of the supply chain with a mitigation to the first potential attack based on the first attack graph, wherein the mitigation modifies the consequence of the first potential attack occurring at features of the supply chain; and
generating a second attack graph representative of a second potential attack on features in the supply chain based upon the updated directed graph representation of the supply chain.

\* \* \* \* \*